(12) United States Patent
Kikuchi et al.

(10) Patent No.: US 6,570,837 B1
(45) Date of Patent: May 27, 2003

(54) INFORMATION RECORDING MEDIUM INCLUDING PLAYBACK INTERRUPT INFORMATION TABLE

(75) Inventors: Shinichi Kikuchi, Yokohama (JP); Yuji Ito, Tokyo (JP); Kazuhiko Taira, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 84 days.

(21) Appl. No.: 09/621,053

(22) Filed: Jul. 21, 2000

Related U.S. Application Data

(62) Division of application No. PCT/JP99/00211, filed on Jan. 21, 1999.

(30) Foreign Application Priority Data

Jan. 21, 1998 (JP) .......................................... 10-009901

(51) Int. Cl.7 .............................. G11B 7/24; H04N 5/76
(52) U.S. Cl. ...................... 369/275.1; 386/95; 386/125
(58) Field of Search ........................... 369/275.1, 275.3, 369/275.4, 30.04, 53.34, 47.13, 47.21, 47.22, 124.07; 386/126, 95, 105, 52, 98, 125, 106

(56) References Cited

U.S. PATENT DOCUMENTS 6,134,383 A * 10/2000 Kikuchi et al. ............... 386/95
6,173,113 B1 * 1/2001 Okada et al. .................. 386/95
6,393,196 B1 * 5/2002 Yamane et al. ................ 386/52

FOREIGN PATENT DOCUMENTS

| JP | 63-292481 A | 11/1988 |
|---|---|---|
| JP | 6-20331 | 1/1994 |
| JP | 7-14164 | 1/1995 |
| JP | 7-226062 A | 8/1995 |
| JP | 7-226062 | 8/1995 |
| JP | 8-339637 A | 12/1996 |
| JP | 9-135421 | 5/1997 |
| JP | 10-106119 | 4/1998 |
| JP | 2002-142195 | 5/2002 |
| JP | 2002-146534 | 5/2002 |

* cited by examiner

Primary Examiner—Ali Neyzari
(74) Attorney, Agent, or Firm—Oblon, Spivak, McClelland, Maier & Neustadt, P.C.

(57) ABSTRACT

In an information recording medium on which video information can be recorded, control information 78 is stored in its data area 76. Following the control information 78, a video object 82 to be reproduced is stored. The control information 78 includes playback interrupt information 124 for resuming playback during the interruption of playback. An area for the process is provided. This makes it possible to reproduce the picture next time where the playback was interrupted, referring to the playback interrupt information 124. Consequently, even when the disk is removed from the video-recordable reproducing system, reinstalling the disk into the system makes it possible to play back the disk where the playback was interrupted.

4 Claims, 18 Drawing Sheets

PLY_MAT

| RBP | | DESCRIPTION | NUMBER OF BYTES |
|---|---|---|---|
| 0 TO 11 | ID | IDENTIFIER | 12 BYTES |
| 12 TO 15 | VOBS_SA | START ADDRESS OF VOBS | 4 BYTES |
| 16 TO 19 | VOBS_EA | END ADDRESS OF VOBS | 4 BYTES |
| 20 TO 23 | CTLI_EA | END ADDRESS OF CTLI | 4 BYTES |
| 24 TO 24 | PLYCI_EA | END ADDRESS OF PLYCI | 4 BYTES |
| 25 TO 28 | CAT | CATEGORY | 4 BYTES |
| 29 TO 30 | V_ATR | VIDEO ATTRIBUTE | 2 BYTES |
| 31 TO 32 | AST_Ns | NUMBER OF AUDIO STREAMS | 2 BYTES |
| 33 TO 34 | AST_ATRT | AUDIO STREAM ATTRIBUTE TABLE | 2 BYTES |
| 35 TO 36 | SPST_Ns | NUMBER OF SUB-PICTURE STREAMS | 2 BYTES |
| 37 TO 38 | SPST_ATRT | SUB-PICTURE ATTRIBUTE TABLE | 2 BYTES |
| 39 TO 39 | USER MENU EXIST FLAG | USER MENU PRESENT/ABSENT FLAG 01: FILE PRESENT, 00: FILE ABSENT | 1 BYTE |
| 40 TO 40 | MAIN PCG NUMBER | PGC NUMBER OF REPRESENTATIVE REDUCED PICTURE | 2 BYTES |
| 41 TO 44 | RESERVED | RESERVATION | 4 BYTES |
| 45 TO 45 | PLAY_END FLAG | FLAG FOR PLAYBACK END 0: UNREPRODUCED, 1: REPRODUCED | 1 BYTE |

FIG.7

PLAYBACK INTERRUPT INFORMATION TABLE

| DESCRIPTION | NUMBER OF BYTES |
|---|---|
| TITLE NUMBER | 1 BYTE |
| PTT NUMBER | 1 BYTE |
| PGC NUMBER | 2 BYTES |
| PROGRAM NUMBER | 2 BYTES |
| CELL ID | 2 BYTES |
| VOBU_ID | 2 BYTES |
| STILL TIME | 1 BYTE |
| STILL REMAINING TIME | 1 BYTE |
| ELAPSED TIME IN CELL | 4 BYTES |
| PLAYBACK TIME | 4 BYTES |
| RECORDING TIME | 4 BYTES |
| TIME INFORMATION FOR TIME SEARCH | 4 BYTES |
| START PTM OF VOBU | 4 BYTES |
| ADDRESS AT WHICH PLAYBACK WAS INTERRUPTED | 4 BYTES |
| AUDIO STREAM NUMBER | 1 BYTE |
| SP STREAM NUMBER & ITS ON/OFF | 1 BYTE |
| GPRM0 | 2 BYTES |
| GPRM1 | 2 BYTES |
| GPRM2 | 2 BYTES |
| GPRM3 | 2 BYTES |
| GPRM4 | 2 BYTES |
| GPRM5 | 2 BYTES |
| GPRM6 | 2 BYTES |
| GPRM7 | 2 BYTES |
| GPRM8 | 2 BYTES |
| GPRM9 | 2 BYTES |
| GPRM10 | 2 BYTES |
| GPRM11 | 2 BYTES |
| GPRM12 | 2 BYTES |
| GPRM13 | 2 BYTES |
| GPRM14 | 2 BYTES |
| GPRM15 | 2 BYTES |

FIG. 9

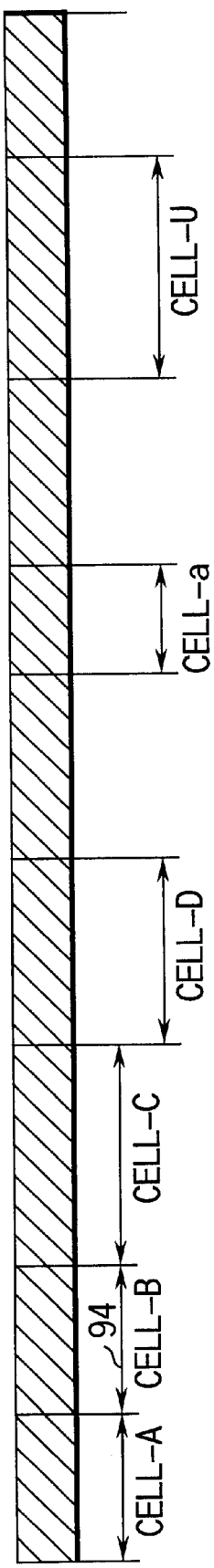

PGC_MAI

| RBP | | DESCRIPTION | NUMBER OF BYTES |
|---|---|---|---|
| 0 TO 3 | PGCI_TABLE_EA | END ADDRESS OF PGCI_TABLE | 4 BYTES |
| 4 TO 7 | PGC_MAI_EA | END ADDRESS OF PGCI_MAI | 4 BYTES |
| 8 TO 11 | PGC_SRP_SA | START ADDRESS OF PGC_SRP | 4 BYTES |
| 12 TO 15 | PGC_SRP_EA | END ADDRESS OF PGC_SRP | 4 BYTES |
| 16 TO 19 | PGCI_SA | START ADDRESS OF PGCI | 4 BYTES |
| 20 TO 23 | PGCI_EA | END ADDRESS OF PGCI | 4 BYTES |
| 24 TO 25 | PGC_Ns | TOTAL NUMBER OF PGCs | 2 BYTES |

PGC_GI

| RBP | | DESCRIPTION | NUMBER OF BYTES |
|---|---|---|---|
| 0 TO 3 | PGC_CNT | CONTENTS OF PGC | 4 BYTES |
| 4 TO 7 | PGC_PB_TM | PGC PLAYBACK TIME | 4 BYTES |
| 8 TO 23 | PGC_AST_CTLT | PGC AUDIO STREAM CONTROL TABLE | 16 BYTES |
| 24 TO 151 | PGC_SPST_CTLT | PGC SUB-PICTURE STREAM CONTROL TABLE | 128 BYTES |
| 152 TO 159 | PGC_NV_CTL | PGC NAVIGATION CONTROL | 8 BYTES |
| 160 TO 223 | PGC_SP_PLT | SUB-PICTURE PALETTE TABLE | 64 BYTES |
| 224 TO 225 | PGC_PGMAP_SA | START ADDRESS OF PROGRAM TABLE | 2 BYTES |
| 226 TO 227 | CELL_PLY_I_SA | START ADDRESS OF CELL_PLY_I | 2 BYTES |
| 228 TO 229 | CELL_Ns | NUMBER OF CELLS USED | 2 BYTES |
| 230 TO 230 | PGC MENU DATA EXIST FLAG | USER MENU DATA PRESENT/ABSENT FLAG 01: DATA PRESENT, 00: DATA ABSENT | 1 BYTE |
| 231 TO 234 | RESERVED | RESERVATION | 4 BYTES |
| 235 TO 235 | PLAY_END_FLAG | PLAYBACK END FLAG 0: UNREPRODUCED, 1: REPRODUCED | 1 BYTE |
| 236 TO 236 | ARCHIVE FLAG | PERMANENT STORAGE FLAG 0: FREE, 1: PERMANENT STORAGE | 1 BYTE |

CELL_PLY_I

| RBP | | DESCRIPTION | NUMBER OF BYTES |
|---|---|---|---|
| 0 TO 3 | C_CAT | CATEGORY OF CELL | 4 BYTES |
| 4 TO 7 | C_PBTM | PLAYBACK TIME OF CELL | 4 BYTES |
| 8 TO 8 | PLAY_END FLAG | PLAYBACK END FLAG 0: UNREPRODUCED, 1: REPRODUCED | 1 BYTE |
| 9 TO 9 | ARCHIVE FLAG | PERMANENT STORAGE FLAG 0: FREE, 1: PERMANENT STORAGE | 1 BYTE |
| 10 TO 12 | CELL_SA(1072) | START ADDRESS OF CELL | 4 BYTES |
| 13 TO 16 | CELL_EA(1073) | END ADDRESS OF CELL | 4 BYTES |

FIG. 13

REC_MAT

| RBP | | DESCRIPTION | NUMBER OF BYTES |
|---|---|---|---|
| 0 TO 3 | RECI_EA | END ADDRESS OF RECI | 4 BYTES |
| 4 TO 7 | REC_MAT_EA | END ADDRESS OF REC_MAT | 4 BYTES |
| 8 TO 11 | FREE_SPACE | FREE CAPACITY | 4 BYTES |
| 12 TO 12 | ARCHIVE FLAG | PERMANENT STORAGE FLAG 0: FREE, 1: PERMANENT STORAGE | 1 BYTE |

FIG. 14

| RSM_MRKI | | |
|---|---|---|
| | | DESCRIPTION |
| RBP | | |
| 134 | PGCN | PGC NUMBER |
| 135 | PGN | PG NUMBER |
| 136 TO 137 | CN | CELL NUMBER |
| 138 TO 143 | MRK_PT | MARKER POINTER |
| 144 TO 148 | MRK_TM | TIME WHEN MARKING IS DONE |

INFORMATION RECORDING MEDIUM INCLUDING PLAYBACK INTERRUPT INFORMATION TABLE

This is a division of application Ser. No. PCT/JP99/00211, filed Jan. 21, 1999.

TECHNICAL FIELD

This invention relates to an information reproducing system, an information recording/reproducing system, and a recording medium applicable to the system, and more particularly to a reproducible playback DVD player, a recording/playback DVD player, and an optical disk applicable to these DVD players.

BACKGROUND ART

In recent years, a system for playing back an optical disk on which images (moving pictures), sound, and others have been recorded has been developed. LDs (laser disks) or video CDs (video compact discs) which enable the playback of movie software, karaoke, and the like have been put on the market and widely used.

The DVD standard using the internationally standardized MPEG-2 (Moving Image coding Experts Group) scheme as a moving-picture compression scheme and the AC-3 audio compression scheme as an audio coding mode has been proposed. Optical disks complying with the standard (hereinafter, just referred to as DVD disks) are commercially available and widely used.

The DVD standard adopts a moving-picture compression scheme conforming to the MPEG-2 system layers, supports AC-3 audio or MPEG audio as an audio coding mode, and has a data structure including not only a sub-picture pack in which sub-picture data obtained by run-length compressing the bit map data for subtitles has been stored independently but also a navigation pack in which special playback control data, such as fast-forward playback or fast-rewind playback data, has been stored independently in a similar manner. Furthermore, the DVD standard supports ISO 9660 and micro UDF to allow computers to read data.

Presently, the DVD standard has been determined in the form of playback-only formats and therefore is not applicable to home recording/reproducing optical disks and their players. Thus, when recording/reproducing systems for home use are constructed according to the DVD standard, it is clear that the following problems arise. A playback-only DVD video player generally has a resume playback function of, after the interruption of playback, resuming the playback where it was interrupted. Specifically, in the resume playback function, when the playback of the inserted disk has been interrupted, information on the location (address) of the place where playback was just in progress is stored in the RAM in the player, information on the location is accessed, for example, the resume playback key is pressed, or the play key is pressed once to read data on the location where playback was just in progress from the memory, and thereafter, the playback is resumed where it was interrupted, or the play key is pressed again to restart the normal playback.

In the resume playback function in a presently popularized playback-only DVD video player, when the disk is removed, the playback end information on the disk disappears. Even if the same disk is inserted again, it is impossible to resume playback where the playback of the disk was interrupted. This causes a problem: the user himself or herself has to seek the location to be played back. A playback-only DVD video player of the latest model uses an EE-ROM as a memory for storing the playback end information and has the information disk by disk (for example, being capable of storing the playback end information for up to ten disks). Even when the disk is changed, the location to be played back can be searched for.

However, there is a limit to the storage capacity of the memory that uses the method of storing the playback end information. Thus, it is expected that unlimited replacement of disks will make it impossible to search for the playback location.

The DVD player systems have the following problem: when the disk is removed, the playback end information on the disk disappears, and therefore, the user has to seek the playback location, even when the same disk is inserted, to resume playback where it was interrupted.

DISCLOSURE OF INVENTION

An object of the present invention is to provide a disk which enables the interruption of playback where it was interrupted, provided that, after the disk was removed from a playback system capable of recording, the disk is installed again in the system.

Another object of the present invention is to provide an information reproducing system capable of resuming playback where it was interrupted, provided that, after a disk was removed from a system capable of recording, the disk is installed again in the system.

Still another object of the present invention is to provide an information recording/reproducing system capable of resuming playback where it was interrupted, provided that, after a disk was removed from a playback system capable of recording, the disk is installed again in the system.

The foregoing objects are accomplished by providing an information recording medium on which video information, audio information, and others can be recorded, the information recording medium characterized by including an area in which playback interrupt information for resuming playback during the interruption of playback can be recorded.

According to the invention, there is provided an information recording/reproducing system for reproducing video information and audio Information from an information recording medium on which video information, audio information, and others can be recorded and which includes a recording area in which playback interrupt information for resuming playback during the interruption of playback can be recorded, the information reproducing system characterized by comprising a specifying section for specifying the resumption of playback and a playback interrupt reading section for reading the playback interrupt information from the recording area according to the specification from the specifying section and in that the system resumes playback where playback was interrupted, according to the specification from the specifying section.

Furthermore, according to the invention, there is provided an information recording/reproducing system for reproducing video information and audio information from an information recording medium on which video information, audio information, and others can be recorded and which includes a recording area in which playback interrupt information for resuming playback during the interruption of playback can be recorded, the information recording/reproducing system characterized by comprising a specifying section for specifying the interruption of playback and a recording section for recording the playback interrupt information in the recording area according to the specification from the specifying means.

With the information recording/reproducing system of the present invention, since the playback interrupt information has been written on the disk, even when the disk is removed from the system, reinstalling the disk into the system makes it possible to resume playback.

BRIEF DESCRIPTION OF DRAWINGS

FIG. 7 shows the contents of the playback management table (PLY_MAT) shown in FIG. 6.

FIG. 9 shows the contents of the playback interrupt information table shown in FIG. 6.

FIGS. 10A, 10B, 10C, and 10D are diagrams to help explain the concept of the PGC shown in FIG. 8.

FIG. 11 shows the contents of the PGC information management information shown in FIG. 8.

FIG. 12 shows the contents of the PGC general information shown in FIG. 8.

FIG. 13 shows the contents of the cell playback information shown in FIG. 8.

FIG. 14 shows the contents of the recording management table shown in FIG. 6.

Best Mode for Carrying Out the Invention

Hereinafter, referring to the accompanying drawings, a digital information recording/reproducing system according to an embodiment of the present invention will be explained.

A typical embodiment of the digital information recording/reproducing system according to the present invention is a system for recording and reproducing the moving pictures encoded on the basis of MPEG 2 at a variable bit rate, such as a DVD video digital recorder.

Figure 1:
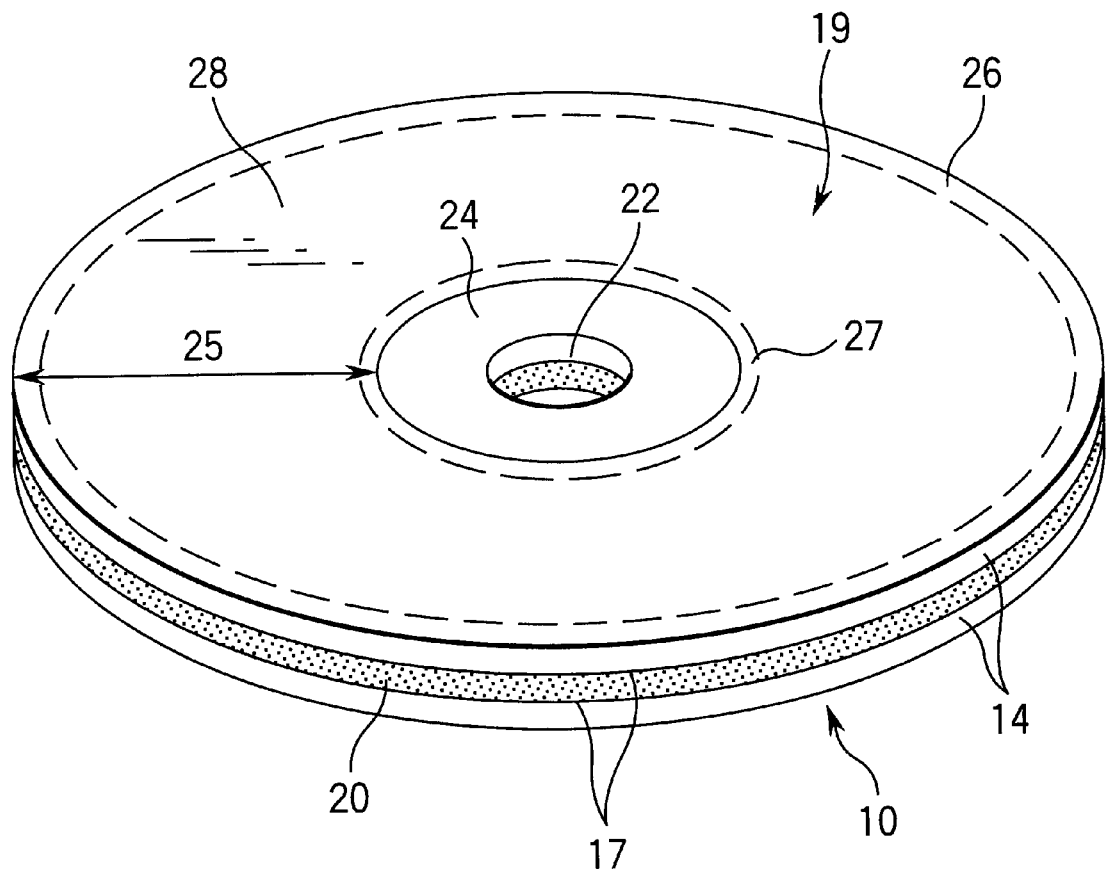
FIG. 1 is a perspective view to help explain the cinfiguration of an optical disk (DVD-RAM or DVD-RW) that enables recording and reproducing.

FIG. 1 is a perspective view to help explain the configuration of a recordable optical disk used for the DVD digital video recorder.

As shown in FIG. 1, the optical disk 10 is such that two transparent substrates 14, each provided with a recording layer 17, are laminated together with an adhesive layer 20. Each substrate 14 can be composed of 0.6-mm-thick polycarbonate and the adhesive layer 20 can be composed of very thin (for example, 40-$\mu$m-thick) ultraviolet-curing resin. The two 0.6-mm-thick substrates 14 are laminated together in such a manner that the recording layers 17 come into contact with the surfaces of the adhesive 20, thereby forming a 1.2-mm-thick large-capacity optical disk 10.

In the optical disk 10, a central hole 22 is made. Around the central hole 22 on both sides of the disk, there are provided clamp areas 24 for clamping the optical disk 10 when it is being rotated. When the optical disk 10 is loaded into a disk drive unit (not shown), the spindle of a disk motor is inserted in the central hole 22. Then, the optical disk 10 is clamped at the clamp areas 24 by a disk damper (not shown), while it is being rotated.

The optical disk 10 has an information area 25 on which video data, audio data, and other information can be recorded, around the clamp area 24. In the information area 25, a lead-out area 26 is provided on its outermost side and a lead-in area 27 is provided on its innermost side in contact with the clamp area 24. Between the lead-out area 26 and the lead-in area 27, a data recording area 28 is defined.

On the recording layer (light reflecting layer) 17 in the information area 25, a recording track is formed continuously in, for example, a spiral. The continues track is divided into physical sectors. These sectors are numbered serially. Using the sectors as units of recording, various types of data are recorded on the optical disk 10.

The data recording area 28 is an actual data recording area, in which video data (main picture data), such as movies, sub-picture data, such as subtitles or menus, and audio data, such as lines or sound effects, have been recorded as recording/reproducing information in the form of bit trains (which are a physical form or phase change state that causes the reflected laser light to change optically).

When the optical disk 10 is a RAM disk for recording/reproducing, the recording layer 17 can be composed of a triple layer formed by sandwiching a phase change recording material layer (for example, $Ge_2Sb_2Te_5$) between two zinc sulfide-silicon oxide mixtures ($ZnS \cdot SiO_2$).

In the read-only DVD-ROM disk 10, pit trains are formed in the substrate with a stamper beforehand. On the surface of the substrate 14 in which the pit trains have been formed, a reflecting layer made from, for example, metal, is formed. The reflecting layer is used as the recording layer 17. In such a DVD-ROM disk 10, grooves acting as recording tracks are generally not made and the pit trains made at the surface of the substrate 14 function as tracks.

In each of the various types of optical disk 10, playback-only ROM information is recorded in the recording information area of the recording layer 17 in the form of an emboss signal. In contrast, such an emboss signal has not been etched in the recording information area of the substrate 14 having the recording layer 17 for recording and reproducing and instead a continuous groove has been etched. A phase change recording layer has been provided in the groove. In the case of a recording/reproducing DVD-RAM disk, not only the groove but also the phase change recording layer of the land portion is also used for information recording.

The DVD digital video recorder is designed to be capable of the repetitive recording and playback (reading and writing) of a DVD-RAM disk (or DVD-RW disk) and of the repetitive playback of a DVD-ROM disk.

Figure 2A:
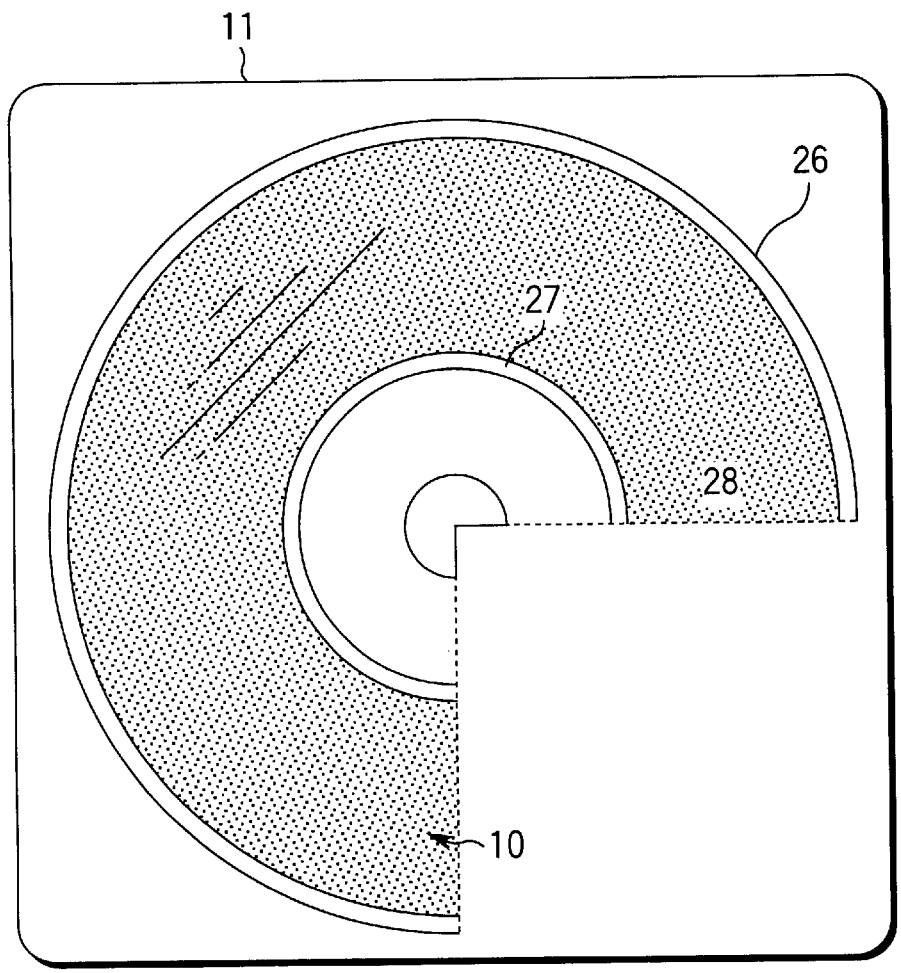
FIGS. 2A and 2B are diagrams to help explain the data recording area on the optical disk (DVD-RAM) of FIG. 1 and a correlation between the recording tracks for the data recorded in the area and the data recording area.
Figure 2B:
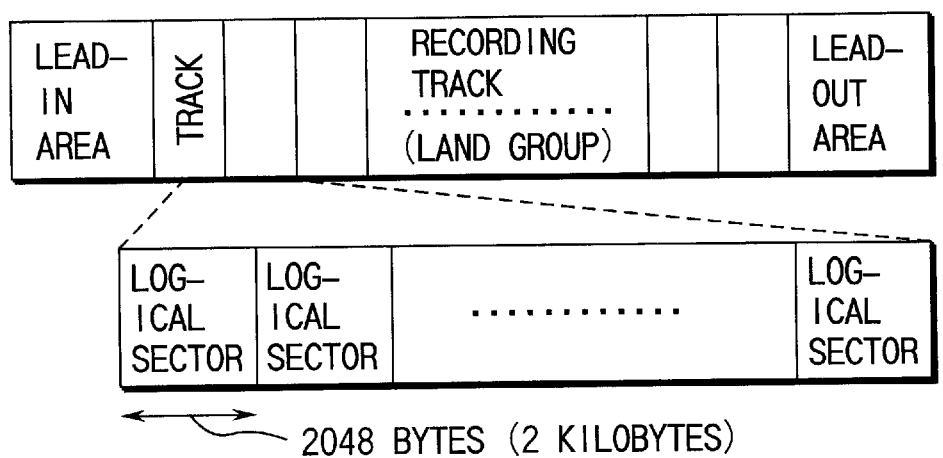

FIGS. 2A and 2B are diagrams to help explain the data recording area 28 on the optical disk (DVD-RAM) 10 of FIG. 1 and a correlation between the recording tracks for the data recorded in the area and the data recording area.

When the disk 10 is a DVD-RAM (or DVD-RW), the body of disk 10 is housed in a cartridge 11 to protect the delicate disk surfaces. After the DVD-RAM disk 10, together with the cartridge 11, is inserted into the disk drive of the DVD video recorder, explained layer, the disk 10 in the cartridge 11 is clamped to the turn table of the spindle motor and is rotated in such a manner that the disk faces the optical head (not shown).

On the other hand, when the disk 10 is a DVD-R or DVD-ROM, the body of the disk 10 is not housed in a cartridge 11, the naked disk 10 is set directly on the disk tray of the disk drive.

At the recording layer 17 in the information area 25 shown in FIG. 1, the data recording track has been formed continuously in a spiral. As shown in FIG. 2B, the continues track is divided into logical sectors (minimum recording units) with a specific storage capacity. Data is recorded in logical sectors. The storage capacity of one logical sector is set to 2048 bytes (or 2 kilobytes), the same as one pack data length.

The data recording area 28 is an actual data recording area, in which management data, main picture (video) data, sub-picture data, and sound (audio) data have been recorded similarly.

Figure 3:
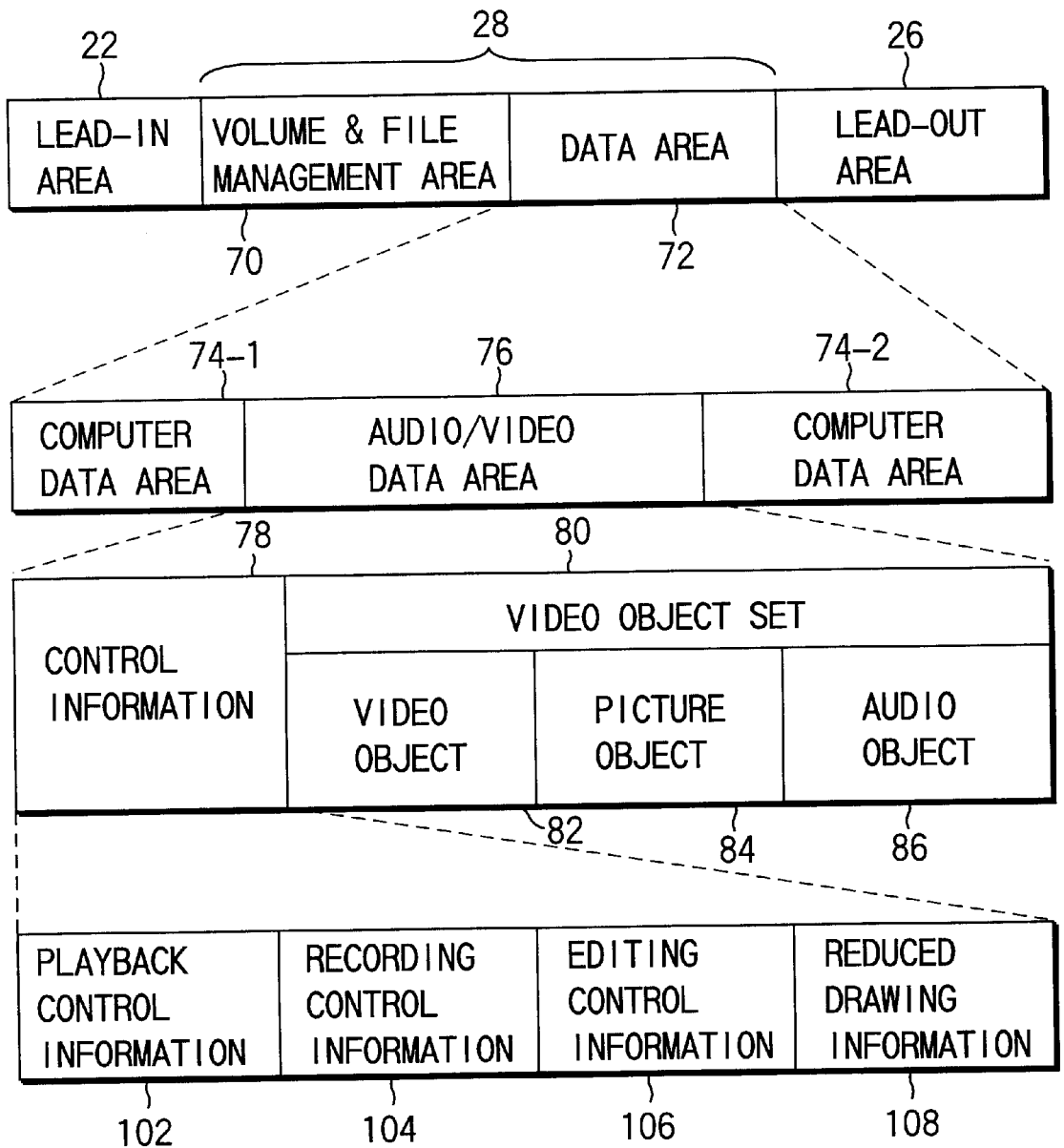
FIG. 3 is a diagram to help explain the directory structure of the information recorded on the optical disk of FIGS. 1 and 2.

FIG. 3 shows the hierarchical structure of the data recorded on the optical disk 10 acting as an information storage medium that enables the recording and reproducing of the image information and music information shown in FIGS. 1 and 2.

The data recording area 28 formed on the optical disk 10 shown in FIGS. 1 and 2 has the hierarchical structure of data as shown in FIG. 3. The logical format of the structure is determined so as to comply with ISO 9660, one of the international standards, and with the universal disk format (UDF) bridge.

As shown in FIG. 3, the lead-in area 27 is provided on the inner circumference side of the optical disk 10 and the lead-out area 26 is provided on the outer circumference side of the optical disk 26. The data recording area 28 between the lead-in area 27 and the lead-out area 26 is assigned as a volume space. The volume space 28 includes a space (volume/file management area 70) for information on the volume and file structure and a space (DVD data area 71) for applications conforming to the DVD standard.

The lead-in area 27 includes a read-only emboss zone where the optical reflecting surface is uneven, a mirror zone where the surface is a flat mirror, and a rewritable data zone where information can be rewritten. The lead-out area 26 is composed of a rewritable zone that enables information to be rewritten.

In the emboss data zone of the lead-in area 27, information about the whole information storage medium, including the type of disk, such as DVD-ROM (read-only DVD disk), DVD-RAM (recording/reproducing DVD disk), or DVD-R (postscript-type DVD disk), the disk size, the recording density, and the physical sector numbers indicating the recording start/recording end positions, has been recorded. In addition, information about the recording, reproducing, and erasing characteristics, including the recording power and recording pulse width needed to record the data in the recording layer 17, the recording power needed to erase the data recorded in the recording layer 17, the reproducing power needed to reproduce the data recorded in the recording layer 17, and the linear velocity during recording and erasing, has been recorded. Furthermore, in the emboss data zone of the lead-in area 27, information on the manufacture of each information storage medium, including the serial number, has been recorded. Each of the rewritable data zone 27 of the lead-in area and the rewritable data zone of the lead-out area includes a recording area for recording a unique disk name for each information storage medium, a checking trial recording area for checking whether recording and erasing can be done under the recording and erasing conditions, and a management information recording area for the presence or absence of a faulty area in the data area 72 and the address of the area. A preparatory process for enabling data to be recorded in the data area 72 is carried out in this area, and the information necessary for subsequent data recording, erasing, and reproducing is recorded.

The volume space 28 is divided physically into a large number of sectors. Those physical sectors are assigned consecutive numbers. The logical addresses for the data recorded in the volume space (data recording area) 28 mean logical sector numbers as determined in ISO 9660 and UDF bridge. The size of the logical sector is set to 2048 bytes (2 kilobytes) as the valid data size of the physical sector. The logical sector numbers are allocated consecutive numbers in ascending order of the physical sector numbers.

The volume space 28 has a hierarchical structure and includes a volume/file management area 70 and a data area 72 composed of one or more video objects. These areas 70 and 72 are separated on the boundary between logical sectors. One logical sector is defined as containing 2048 bytes. One logical block is also defined as containing 2048 bytes. Therefore, one logical sector is defined as being identical with one logical block.

The volume/file management area 70 is a rewritable data zone in which the user can record and rewrite data and corresponds to a management area determined in ISO 9660 and UDF bridge. On the basis of the description in the area 70, information about the whole file or volume of audio/video data is stored in the system memory (not shown) in a DVD video recorder explained later. In general, the volume/file management area 70 is composed of one file.

The data area 72 is designed to enable computer data and audio data to be recorded in a mixed manner as shown in FIG. 3. The order in which computer data and audio and video data are recorded and the size of each recording information are arbitrary. Areas in which computer data has been recorded are referred to as computer data areas 74-1, 74-2. An area in which audio and video data has been recorded is referred to as an audio and video data area 76. When only audio and video data is recorded in the recording area 72, the computer data areas 74-1, 74-2 are not necessarily provided because of their nature. Similarly, when only computer data is recorded in the recording area 72, the audio and video data area 76 is not necessarily provided because of its nature. Each of the computer data areas 74-1, 74-2, and audio and video data area 76 is composed of one or more files.

In the audio and video data area 76, control information 78 necessary to carry out each of the video recording (audio recording), reproducing, editing, and retrieving processes, and the object to be reproduced, or a video object set 80 composed of one or more video objects 82, 84, and 86 as contents, are recorded as shown in FIG. 3. The video object 80 includes a video object 80 whose content is video data, a picture object 84 whose content is still pictures, such as still slides, the desired location in the video data, or picture data, such as retrieving or editing thumbnails, and an audio object 86 whose content is audio data. Apparently, it is sufficient that the video object set 80 is composed of at least one of these objects 82, 84, 86. It is not necessary to prepare all the objects 82, 84, 86. Similarly, each of the objects 81, 84, 86 is composed of one or more files.

Figure 4:
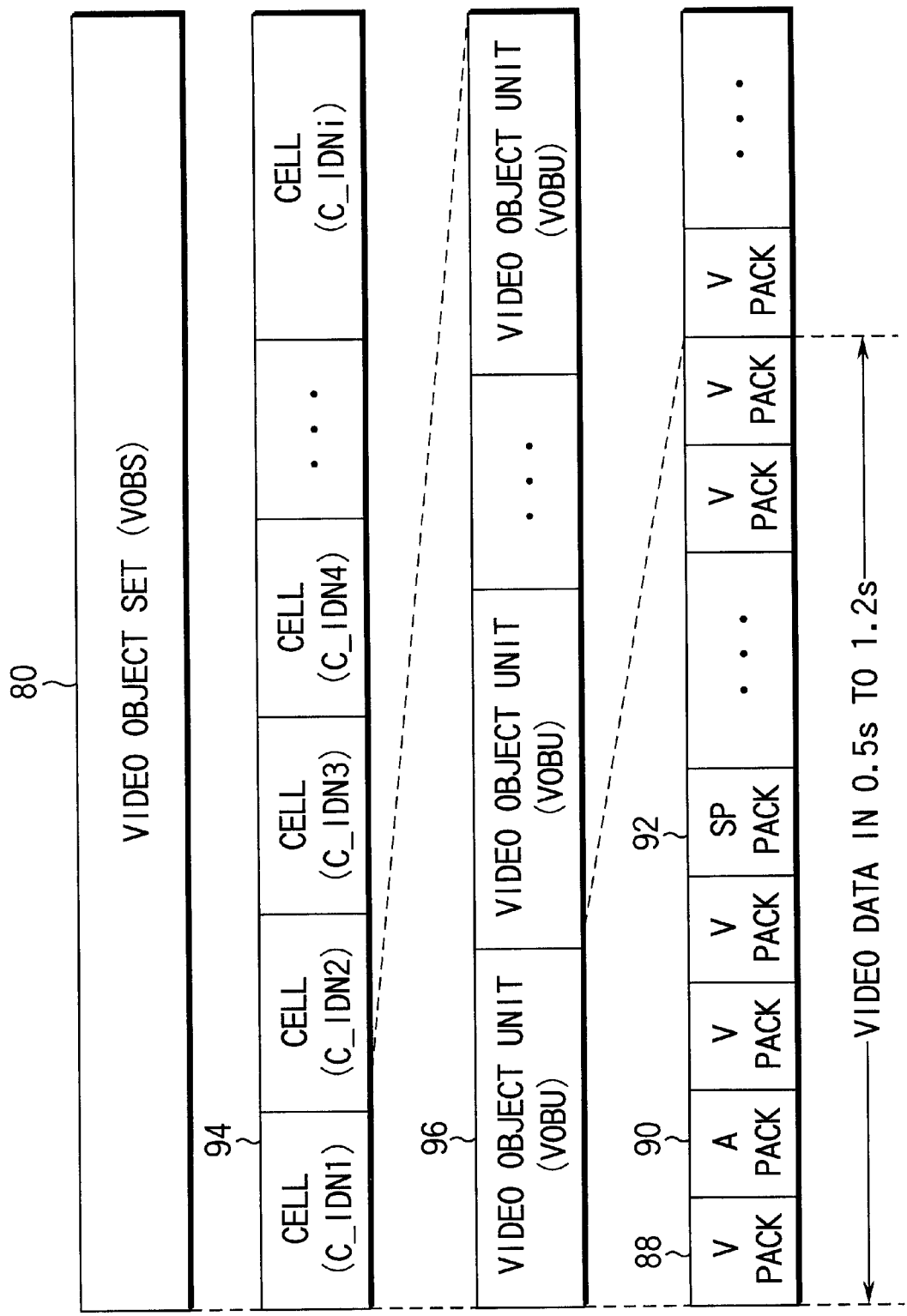
FIG. 4 shows the data structure of the video object set shown in FIG. 3.

In the video object set 80 composed of one or more objects 82, 84, 86, video data (video packs 88 explained later) compressed according to the MPEG standard, audio data (audio packs 90 explained later) compressed according to a specific standard or uncompressed, and run-length-compressed sub-picture data (sub-picture packs 92 including bit maps, explained later, where one pixel is defined by bits) have been stored as shown in FIG. 4. Apparently, when the video object set 80 is composed of video objects 80, it has a data structure as shown in FIG. 4. When the video object set 80 is composed of picture objects 84, it has a data structure composed of only video packs 88 including no audio pack 90 and/or sub-picture packs. In addition, when the video object set 80 is composed of audio objects 86, it has a data structure composed of only audio packs 90 including neither a video pack 88 nor a sub-picture pack 92.

As shown in FIG. 4, the video object set 80, or the video, picture, and audio objects 82, 84, 86 are logically composed of plural cells 94. Each cell 84 is composed of one or more video object units (UOBUS) 96. In the cell 84, the video object units (VOBUS) 96 are decoded and reproduced in the order in which they are arranged in the cell 84, as a general rule. Each video object unit 85 is a set (pack train) of video packs (V packs) 88, sub-picture packs (SP packs) 92, and audio packs (A packs) 90 and is defined as data to be reproduced in a period of, for example, 0.5 to 1.2 seconds. These packs are minimum units in performing data transfer. The data is processed using logical cells as minimum units. The video object units (VOBUS) are assigned identification numbers (IND#k; k=0 to k). The identification numbers enable the video object units 96 to be identified. The playback period of the video object unit 96 generally corresponds to the playback time of the video data composed of one or more picture groups (groups of pictures; abbreviated as GOPs) included in a video object unit (VOBU) 85. One GOP generally lasts for about 0.5 second in the MPEG standard and is converted into screen data compressed so as to reproduce about 15 frames of pictures in about 0.5 second.

When the video object unit VOBU 96 includes video data, GOPs (conforming to the MPEG standard) composed of video packs 88, sub-picture packs 90, and audio packs 91 are arranged, thereby forming a video data stream. Even when playback data is composed of only audio and/or sub-picture data, it is constructed using a video object unit (VOBU) 96 as one unit. For example, the video object unit (VOBU) 85 may be composed of only audio data. In this case, as with the video object VOB including video data, the audio packs 90 to be reproduced during the playback time of the video object unit (VOBU) 85 to which the audio data belongs are stored in the video object unit (VOBU) 96.

The video objects 82, 84, 86 constituting the video object set 80 are assigned identification numbers (IND#i; i=0 to i).

The identification numbers enable the video objects 82, 84, 86 to be identified. Like the video objects 82, 84, 86, each cell 94 is assigned an identification number (C_IDN#j).

Figure 5:
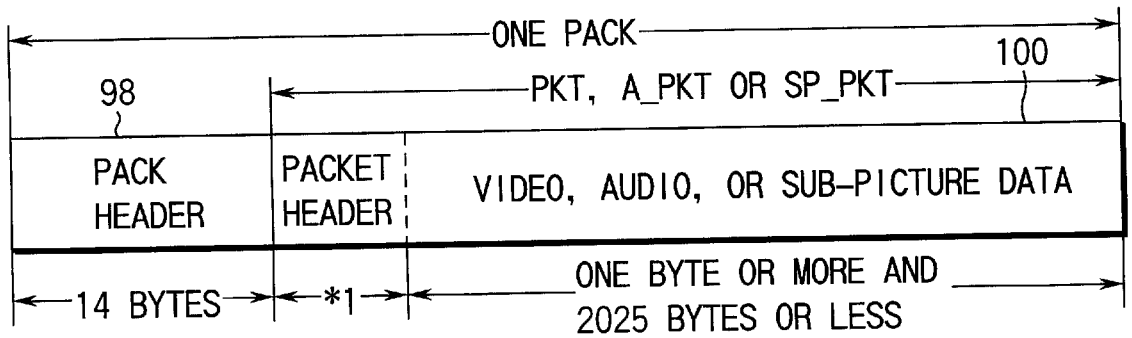
FIG. 5 shows the structure of a data pack shown in FIG. 4.

FIG. 5 shows a general structure of the video pack 88, sub-picture pack 92, and audio pack 90. Like the logical sector of FIG. 2, each of these packs contains 2048 bytes of data. Each of the video, audio, and sub-picture packs 88, 90, 92 is composed of a pack header 98 and a packet 100 as shown in FIG. 5. The packet 100 includes a packet header. In the packet header, a decode time stamp (DST) and a presentation time stamp (PTS) have been recorded.

The control information shown in FIG. 3 includes playback control information 102 indicating control information necessary for playback, recording control information 104 indicating control information necessary for recording (video recording and audio recording), editing control information 106 indicating control information necessary for editing, and thumbnail picture control information 108 indicating management information about searching or editing thumbnails for locations in the video data the user wants to watch.

Figure 6:
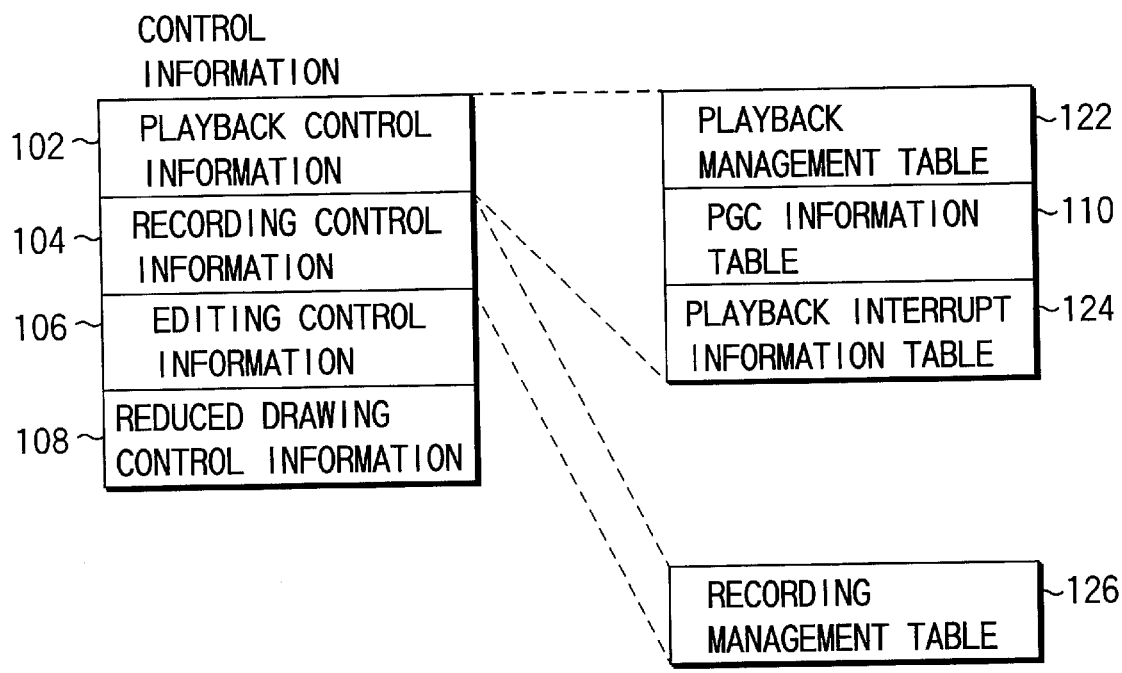
FIG. 6 shows the data structure of the control information shown in FIG. 4.
Figure 8:
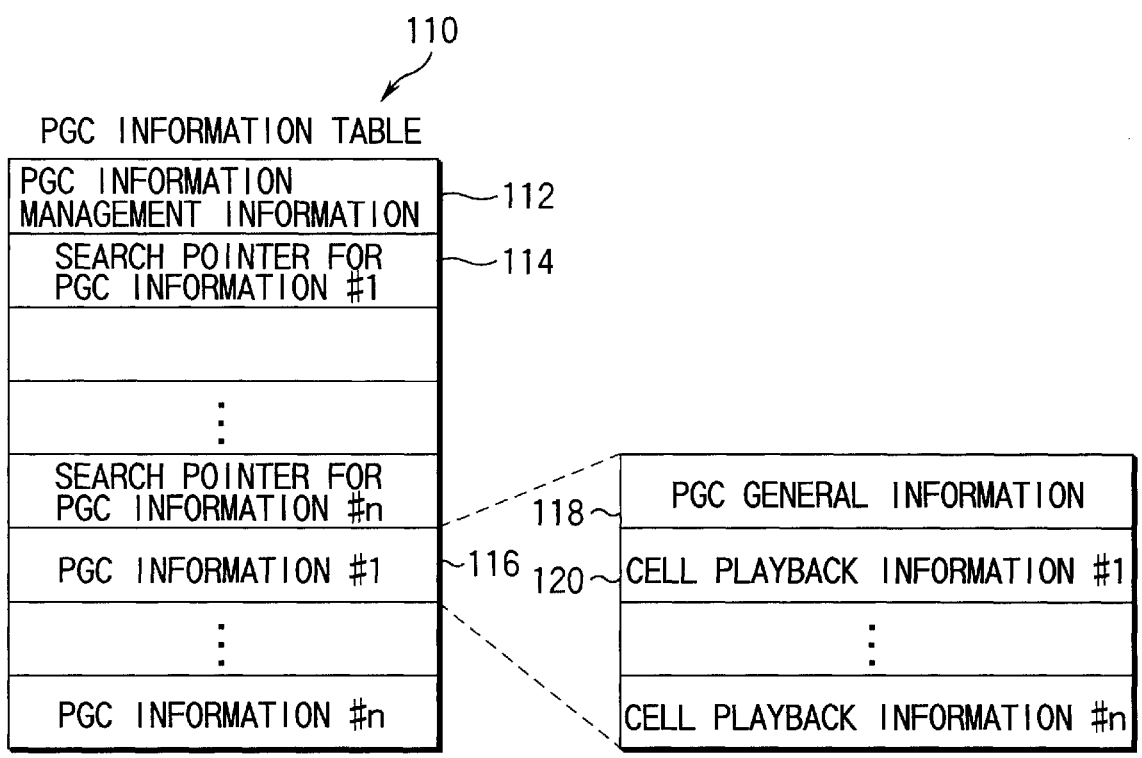
FIG. 8 shows the data structure of the PGC information table shown in FIG. 6.

The playback control information 102 shown in FIG. 3 includes a management information table (PLY_MAT) 122, a program chain (PGC) information table (PGC IT) 110, and a playback interrupt information table (PLY_IIT) 124 as shown in FIG. 6. In the management information table (PLY_MAT) 122, the information as shown in FIG. 7 has been written. The program chain (PGC) information table 110 has a data structure as shown in FIG. 8. In the playback interrupt information table 124, the information as shown in FIG. 9 has been written.

As shown in FIG. 8, the PGC information table 110 is composed of PGC information management information 112, search pointers #1 to #n 114 for searching for each piece of PGC information, and pieces of PGC information #1 to #n 116. In the program chain (PGC) information table 110, information about the order in which program chains (PGCs) and cells are reproduced. The data in the cells 94 recorded in the video object 82, that is, the movie data, the actual data, composed of video object units 96, is reproduced according to the description in the program chain (PGC) information table 110. The program chain (PGC) information table 110 is composed of PGC information management information 112, PGC information #1 to PGC information #n, and search pointers 114 for searching for the PGC information (#1) 116 for PGC information (#n) 116. Once the number of PGC has been determined, the cell playback sequence to reproduce the PGC corresponding to the number of the PGC is acquired by referring to the search pointer 114. According to the cell playback sequence, the data in the cell 94 as real data is acquired from the video object 82 and the video is played back. The video object 82 has been explained until now. Similarly, the cell data as real data is taken out from the picture object 84 and audio object 86 according to the description in the program chain (PGC) information table 110 and is reproduced.

The PGC corresponds to a chapter in a movie story and represents a unit for executing a series of playback where the cell playback sequence has been specified. In other words, when one PGC is likened to one drama, the cells 94 constituting the PGC can be interpreted as corresponding to various scenes in the drama. The contents of the PGC (or the contents of the cells) are determined by the software provider that creates the contents recorded on the disk 10. Specifically, when there is a video data stream as shown in FIG. 10A, the contents are divided into video object units 96 to be reproduced in a certain period of time. A set of video object units 96 consecutive in principle is defined as a cell 94.

Because the video object units 96 are consecutive in principle, the cell 94 is defined by the first video object unit 96 and last video object unit 96 constituting the cell in the PGC information 116, more particularly, the cell playback information 120, as explained later. Namely, in the cell playback information 120, information on the playback section specified by the start address and end address of the playback data constituting the cell is written.

Once the cells 94 have been determined, a PGC is constructed by determining the playback sequence of the cells. For example, as shown in FIGS. 10B, 10C, and 10D, three cells 96 are arranged in a cell playback information table in such a manner that cell-A, cell-B, and cell-B are reproduced in that order, thereby defining PGC#1. Similarly, three cells 96 are arranged in the cell playback information table in such a manner that cell-D, cell-E, and cell-F are reproduced in that order, thereby defining PGC#2. Furthermore, five cells 96 are arranged in the cell playback information table in such a manner that cell-Q, cell-R, cell-S, cell-T, and cell-U are reproduced in that order, thereby defining PGC#3. Here, linking PGC#1 and PGC#2 together enables PGC#1 corresponding to a certain chapter to be played back, followed by the playback of PGC#2 corresponding to the next chapter. In other words, cell-A to cell-F are reproduced consecutively. In the PGC, the cells 94 are reproduced in the order of arrangement. Because the way of constructing the PGC and the playback sequence of the PGC are arbitrary, for example, a PGC can be defined by the cells constituting another PGC. In addition, the way of linking, or link information, can be determined arbitrarily, various stories can be created or edited. For example, PGC#3 can be linked, following PGC#1. Adding the same cell, for example, cell G, to PGC#1 and PGC#2 can create a different chapter. The user can make a selection to link PGC#3 to PGC#1 or PGC#2, thereby reproducing any story.

As shown in FIG. 7, in the playback management table 122, an identifier ID indicating playback control information is written. In addition, the start address (VOBS_SA) and end address (VOBS_EA) of the video object set 80 are written. Moreover, the end address (CTLI_EA) of control information (CTLI) 102 and the end address (PLYI_EA) of the playback control information (PLYI) 102 are written. Furthermore, in the playback management table 122, an attribute (CAT) indicating that the management information belongs to a recording/reproducing DVD format is written. In addition, the attribute of the video in the video object set recorded in the audio and video data area 76, such as, the NTSC system or wide, is written. Moreover, the number (ATS_Ns) of audio streams in the similarly recorded video object set and a table (AST_ATR) describing its attribute, for example, the compression scheme, are written. Furthermore, the number (SPST_Ns) of sub-picture streams in the similarly recorded video object set and a table (SPST_ATR) describing its attribute and others are written. When the user has recorded menu picture data and moving-picture or still-picture data in the form of independent files in the audio and video data area 76, if a flag (01) indicating the presence of a user menu or such a menu does not exist, a flag (00) indicating that there is no user menu is written. When a reduced picture has been recorded in the audio and video data area 76, the number of the PGC representing the reduced picture and constituting the basis of the reduced picture is written. In addition, a flag (0: unreproduced, 1: reproduced) indicating whether or not the user has played back the video object set to be reproduced according to reservation and control information 78 is written.

The PGC information management information (PGC_MAI) 112 shown in FIG. 8 includes information indicating the number of PGCs as shown in FIG. 11. The PGC information search pointer 114 includes information pointing at the head of each piece of PGC information as described earlier, making it easier to search for a PGC. The PGC information 116 is composed of PGC general information 118 shown in FIG. 7 and one or more pieces of cell playback information 120 shown in FIG. 8.

Written in the PGC information management information 112 (PGC_MAI) as shown in FIG. 11 are the end address (PGC_TABLE_EA) of the PGC information table 110, the end address (PGC_MAI_EA) of PGC information management information 112 (PGC_MAI), the start address (PGC_SRP_SA) and end address (PGC_SRP_EA) of the PGC information search pointer (PGC_SRP) 114, the start addresses (PGCI_SA) and end addresses (PGCI_EA) of all the pieces of PGC information (PGCI) 116, and the number of all the PGCs (PGC_Ns).

The PGC general information (PGC_GI) 118 includes information indicating the playback time of PGC and the number of cells as shown in FIG. 12. Specifically, written in the PGC general information (PGC_GI) 118 are the number of the PGCs, the contents (PGC_CNT) of the PGC describing the number of cells, the playback time (PGC_PB_TM) of the PGCS, a table (PGC_AST_CTL) describing information to control the audio streams included in the PGCS, and a table (PGC_SPST_CTL) describing information to control the sub-picture streams included in the PGCS. Furthermore, written in the PGC general information (PGC_GI) 118 are link information about a PGC to be linked with the PGC, for example, PGC navigation control (PGC_NV_CTL) describing the preceding PGC, the following PGC, or the (Goup) PGC at the jump destination, a sub-picture pallet table (PGC_SP_PLT) describing reproduction information on the colors on the sub-picture pallet and others, and the start address (PGC_PGMAP SA) of a program table (not shown) listing the programs constituting the PGC. In addition, written in the table (PGC_GI) are the start address of cell playback information (CELL_PLY_I) 120, a flag (01: menu data present, 00: menu data absent) indicating whether or not the user-created menu data on the PGCs is present, reservation, a flag (0: unreproduced, 1: reproduced) indicating whether the user has reproduced the PGCs, and a flag (ARCHIVE Flag) indicating whether or not the user wants to continue storing the PGCS, or a flag (0: free [erasable], 1: permanent storage) indicating that the user wants to store the PGCs forever.

In the cell playback information (CELL_PLY_I) 120 shown in FIG. 8, the category of a cell (C_CAT), for example, whether the cell belongs to a block, and if it belongs to the block, whether the block is an angle block, is written as shown in FIG. 13. Furthermore, in the cell playback information (CELL_PLY_I) 120, the playback time (absolute time) of the cells in the PGC, a flag (0: unreproduced, 1: reproduced) indicating whether the user has reproduced the cell, and a flag (ARCHIVE Flag) indicating whether or not the user wants to continue storing the cell, or a flag (0: free [erasable], 1: permanent storage) indicating that the user wants to store the cell forever. Moreover, in the cell playback information (CELL_PLY_I) 120, the start address (CELL_SA) and end address (CELL_EA) of the cell and the addresses of the first and last video object units (VOBUS) in the cell are written using relative addresses counted from the beginning of the video object set 80.

The angle block means a block that enables the angle to be switched. Angle switching means changing the angle (camera angle) at which the picture of the subject is viewed. In an example of rock concert video, it means that the user can watch scenes taken at various angles, including a scene focusing on the vocalist, a scene focusing on the guitarist, and a scene focusing on the drummer.

The cases where angle switching (or angle changing) is done include a case where angle can be selected according to the liking of the viewer and a case where the same scene is repeated automatically in the flow of the story, while the angle is being changed (a case where the software creator/provider has composed the story that way or a case where the user of the DVD video recorder has edited the story that way).

The playback interrupt information table 124 of FIG. 6 is a table in which the playback interrupt information to be written when the user interrupts the playback is written. As shown in FIG. 9, in the table 124, all of or part of the following items are written at the time of the interruption of the playback: the title number of the title whose playback has been interrupted, the part-of-title number at which the playback has been interrupted, the PGC number at which the playback has been interrupted, the program number in the PGC whose playback has been interrupted, the cell ID whose playback has been interrupted, and the ID of the video object unit whose playback has been interrupted. The title corresponds to a concrete title composed of video objects. The video objects are managed on a title basis. When the user subdivides a title and specifies part of the title, a part-of-title number is assigned and the number is recorded as interrupt information. When the user is a music fan, he or she can record a program for a singer and specify a scene of a special song in the program as part of title. Information on the scene is recorded as interrupt information. Furthermore, when the playback picture is a still picture, the time the still picture lasts and the remaining time of the still picture during the interruption of the playback are written. In addition, the elapsed time in reproducing a cell is written as interrupt information. Moreover, the time during the interruption of the playback and the recording time when the reproduced object is recorded are recorded. Still furthermore, time search time information to determine the time of interruption in the video object set (VOBS) or video object (VOB) temporally, a presentation time stamp representing the time at which the interrupted video object unit (VOBU) 96 is presented, and the address at which the playback was interrupted, for example, the video object unit (VOBU) 96 or the physical sector address on the optical disk at which the playback was interrupted, and others are written. In addition, recorded in the playback interrupt information table 124 are whether or not the audio stream number and sub-picture stream at the time of interruption have been selected (whether or not the sub-picture should be displayed) and the sub-picture stream number at the time of the interruption when the sub-picture stream has been selected and the sub-picture has been displayed. Moreover, if necessary, predetermined general parameters (GPRM 0 to GPRM 15) are written. The general parameters (GPRM 0 to GPRM 15) cause the details of the operation the user has carried out to be stored in memory and change the operation of the player on the basis of the details. The contents written as interrupt information in the playback interrupt information table 124 may include not only the items shown in FIG. 9 but also additional items, as the need arises. Moreover, among the items shown in FIG. 9, the necessary minimum items may be recorded. While the playback interrupt information table 124 have been provided as an independent file at the same level of in hierarchy as that of the playback management table 122 as shown in FIG. 6, it may be provided in the playback management table 122. Alternatively, it may be provided at a higher level of hierarchy than that of the playback management table 122. For instance, it may be provided at the same level of hierarchy as that of the playback control information 102 or that of the control information 78.

The recording control information 104 of FIG. 6 includes a recording management table 126 shown in FIG. 14. In the recording management table 126, the end address (RECI_EA) of the recording control information 104 and the end address (REC_MAT_EA) of the recording management table 126 are written. An empty area (FREE_SPACE) in which information on recording management is to be written is provided in the recording management table 126. Furthermore, in the recording management table 126, a flag (ARCHIVE Flag) indicating whether or not the user wants to store all the VOBS, or a flag (0: free [erasable], 1: permanent storage) indicating that the user wants to store all the VOBS forever.

Figure 15:
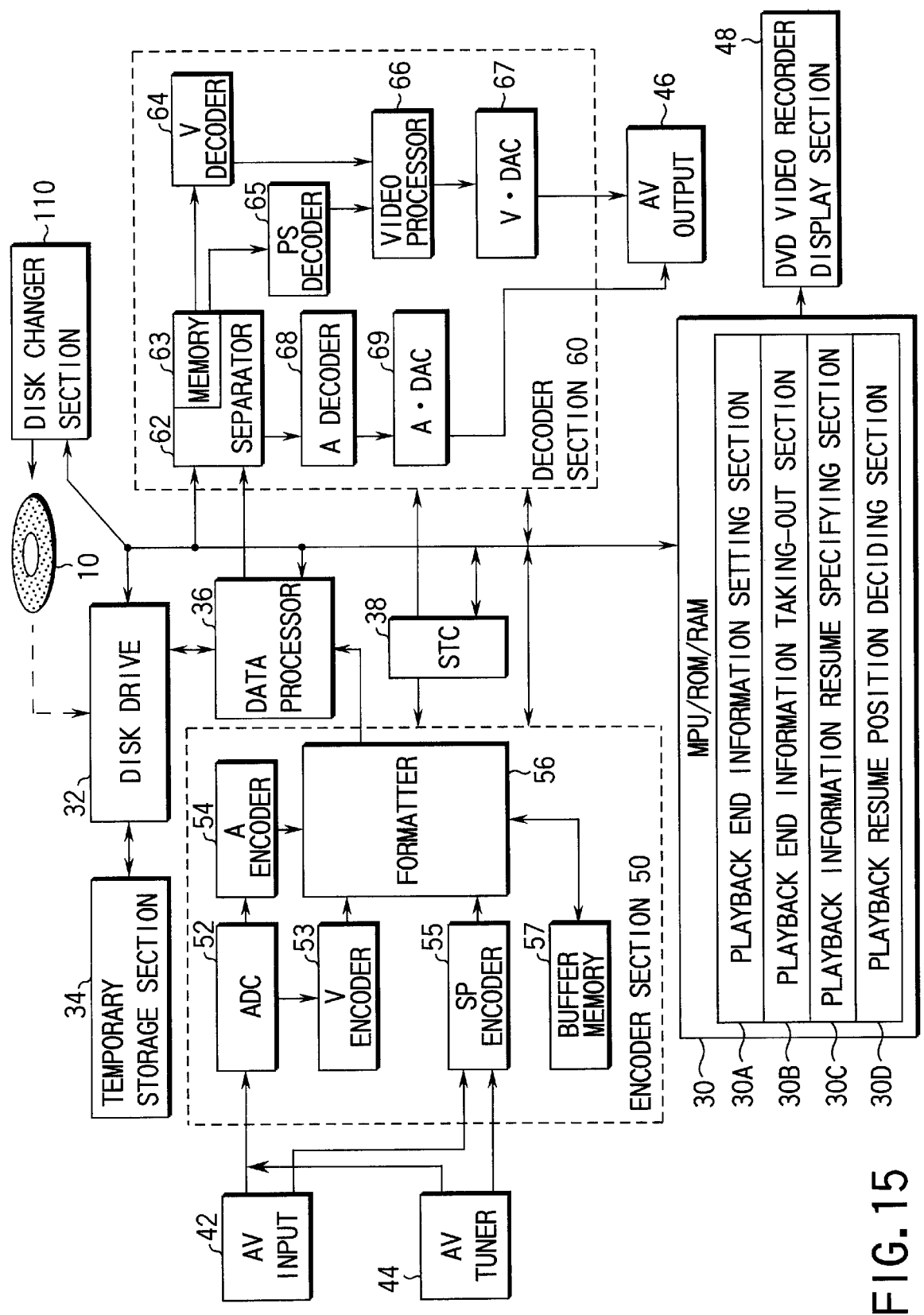
FIG. 15 is a block diagram to help explain the configuration of a system (DVD video recorder) that records and reproduces digital moving-picture information using the information with the structures explained in FIGS. 2 to 14 on the disk of FIG. 1.

FIG. 15 shows an example of the configuration of a system (DVD video recorder) which records and reproduces the digital moving-picture information on and from the disk of FIG. 1 at a variable recording rate using the pieces of information having the structures explained in FIGS. 3 to 14.

The body of the DVD video recorder shown in FIG. 14 is roughly composed of a disk drive section (32, 34, and others) that rotates a DVD-RAM or DVD-R disk 10 and reads and writes information from and on the disk 10, an encoder section 50 constituting the video recording side, a decoder section 60 constituting the playback side, and a microcomputer block 30 for controlling the operation of the body of the system.

The encoder section 50 includes an ADC (analog/digital converter) 52, a video encoder (V encoder) 53, an audio encoder (A encoder) 54, a sub-picture encoder (SP encoder) 55, a formatter 56, and a buffer memory 57.

The external analog video signal+external analog audio signal from an AV input section 42 or the analog TV signal+analog audio signal from a TV tuner 44 are inputted to the ADC 52. The ADC 52 digitizes the inputted analog video signal at, for example, a sampling frequency of 13.5 megahertz, with the number of quantization bits being eight bits. (That is, each of the luminance component Y, color difference component Cr (or Y-R), and color difference component Cb (or Y-B) is quantized in eight bits.)

Similarly, the ADC 52 digitizes the inputted analog audio signal at, for example, a sampling frequency of 48 kilohertz, with the number of quantization bits being 16 bits.

When the analog video signal and digital audio signal are inputted to the ADC 52, the ADC 52 allows the digital audio signal to pass through. (Only jitters incidental to the digital signal may be reduced or the sampling rate or the number of quantization bits may be changed without changing the contents of the digital audio signal.)

On the other hand, when the digital video signal and digital audio signal are inputted to the ADC 52, the ADC 52 allows the digital video signal and digital audio signal to pass through. (As for these digital signals, too, the jitter reducing process, the sampling rate changing process, and others may be carried out without changing the contents of the digital signal.)

The digital video signal component from the ADC 52 is sent to the formatter 56 via the video encoder (V encoder)

53. The digital audio signal component from the ADC 52 is sent to the formatter 56 via the audio encoder (A encoder) 54.

The V encoder 53 has the function of converting the inputted digital video signal into a digital signal compressed at a variable bit rate on the basis of the MPEG-2 or MPEG-1 standard.

The A encoder 56 has the function of converting the inputted digital audio signal into a digital signal (or a linear PCM digital signal) compressed at a fixed bit rate on the basis of the MPEG or AC-3 standard.

When the DVD video signal having a data structure as shown in FIGS. 4 and 5 (for example, the signal from the DVD video player with an independent output terminal for sub-picture signal) is inputted from the AV input section 42, or when the DVD video signal having such a data structure is broadcast and received by the TV tuner 44, the sub-picture signal component (sub-picture pack) in the DVD video signal is inputted to the sub-picture encoder (SP encoder) 55. The sub-picture data inputted to the SP encoder 55 is arranged into a specific signal form. The resulting data is sent to the formatter 56.

The formatter 56 performs specific signal processes on the inputted video signal, audio signal, sub-picture signal, and others, while using the buffer memory 57 as a work area, and outputs to the data processor 36 the recording data that coincides with the format (file structure) as explained in FIGS. 3 to 25.

Here, the contents of a standard encoding process for creating the recording data will be explained briefly. When the encode section 50 of FIG. 15 starts the encoding process, the parameters necessary to encode the video (main picture) data and video data are set. Next, using the set parameters, the main picture data is preencoded and the distribution of the optimum amount of codes for the set average transfer rate (recording rate) is calculated. On the basis of the amount of codes obtained in the preencoding, the main picture is encoded. At this time, the audio data is encoded at the same time.

In a case where the amount of data compression is insufficient as a result of pre-encoding (a case where the desired video program cannot fit to a DVD-RAM disk or DVD-R disk on which the user is going to record the program), if there is a chance to do pre-encoding (for example, if the video recording source is a repeatedly reproducible source, such as a videotape or a video disk), part of the main picture data is encoded again and the main picture data in the reencoded part is replaced with the pre-encoded main picture part. By such a series of processes, the main picture data and audio data are encoded, thereby remarkably reducing the value of the average bit rate necessary for recording.

Similarly, the parameter necessary to encode the sub-picture data is set and the encoded sub-picture data is created.

The encoded main picture data, audio data, and sub-picture data are combined so as to have the structure of the video object.

Specifically, a cell is set as the minimum unit of the main picture data (video data) and cell playback information (C_PLY_I) as shown in FIG. 13 is created. Next, the structure of a cell constituting a program chain (PGC) and the attributes of main picture, sub-picture, and audio, and others are set (pieces of information obtained in encoding each data item are used as part of the attribute information), thereby creating the playback control information 102 including various types of information explained in FIGS. 3 and 6.

The encoded main picture data, audio data, and sub-picture data are subdivided into packs of a specific size (2048 bytes) as shown in FIG. 5. In these packs, time stamps, including PTS (presentation time stamps) and DTS (decode time stamps), are written. As PTS for sub-pictures, the time obtained by arbitrarily delaying the PTS for the main picture data or audio data in the same playback time zone may be written.

Then, the packs are arranged into VOBUS 96, the data to be reproduced in a certain period of time, in such a manner that they can be reproduced in the order of the time codes of the respective data. The VOBUs 96 are arranged, thereby defining each data cell. Then, cells constitute a VOB. A VOBS 80 composed of one or more VOBs is formatted into the structure of FIG. 4.

The disk drive section for reading and writing (video-recording and/or reproducing) information from and on the DVD disk 10 includes a disk changer section 110, a disk drive 32, a temporary storage section 34, a data processor 36, and a system time counter (or system time clock STC) 38.

The temporary storage section 34 is used to buffer a certain amount of the data (the data outputted from the encoder section 50) written onto the disk 10 via the disk drive 32 or a certain amount of the data (the data inputted to the decoder section 60) reproduced from the disk 10 via the disk drive 32.

For example, when the temporary storage section 34 is composed of 4-megabyte semiconductor memory (DRAM), it is possible to buffer about eight seconds of recording or playback data at an average recording rate of 4 mbps. In addition, when the temporary storage section 34 is composed of a 16-megabyte EEPROM (flash memory), it is possible to buffer about 30 seconds of recording or playback data at an average recording rate of 4 mbps. Furthermore, when the temporary storage section 34 is composed of a 100-megabyte ultraminiature HDD (hard disk), it is possible to buffer longer than three minutes of recording or playback data at an average recording rate of 4 mbps.

When the disk 10 has run short in the course of video-recording, the temporary storage section 34 can be used to store the video-recording information until the disk 10 has been replaced with a new one.

Furthermore, when a high-speed drive (double-speed or faster one) is used as the disk drive 32, the temporary storage section 34 can be used to store the extra data read from an ordinary drive in a specific period of time. Buffering the read data during playback in the temporary storage section 34 prevents the playback image from being interrupted, even when the optical pickup (not shown) has made reading errors due to vibrations or shocks, because the playback data buffered in the temporary storage section 34 is used instead.

Under the control of the microcomputer block 30, the data processor 34 of FIG. 14 supplies the DVD recording data from the encoder section 50 to the disk drive 32, takes out the DVD playback signal reproduced from the disk 10 from the drive 32, rewrites the management information recorded on the disk 10, and deletes the data (files or VTS) recorded on the disk 10.

The microcomputer block 30 includes an MPU (or CPU), a ROM in which control programs and others have been written, and a RAM that offers a work area necessary to execute programs.

The MPU of the microcomputer block 30 uses the RAM as a work area according to the control programs stored in the ROM and functions as if it had a playback end information setting section 30A for determining playback end information, a playback end information takeout section 30B for taking out playback end information, a playback information resume specifying section 30C for giving an instruction to resume playback using the playback information, and a playback resume position deciding section 30D for determining the position at which playback is resumed.

Of the results of the execution of the MPU 30, the contents to be reported to the user of the DVD video recorder are displayed on the display section 48 of the DVD video recorder and or on the on-screen display (OSD) of the monitor display.

The timing with which the MPU 30 controls the disk changer section 100, disk drive 32, data processor 36, encoder section 50 and/or decoder 60 can be executed on the basis of the time data from the STC 38 (the operation of video-recording and reproducing is generally executed in synchronization with the time clock from the STC 38. The other processes may be executed with the timing independent from the STC 38).

The decoder section 60 includes a separator 62 for separating and taking out each pack from the DVD playback data having a pack structure as shown in FIG. 5, a memory 63 used in executing pack separation and other signal processes, a video decoder (V decoder) 64 for decoding the main picture data separated by the separator 62, a sub-picture decoder (SP decoder) 65 for decoding the sub-picture data (the contents of the sup-picture pack 90) separated by the separator 62, an audio decoder (A decoder) 68 for decoding the audio data (the contents of the audio pack 91 of FIG. 9) separated by the separator 62, a video processor 66 for combining the video data from the V decoder 74 with the sub-picture data from the SP decoder 65 suitably and superposing sub-pictures, including a menu, highlight buttons, and subtitles, on the main picture, a video digital/analog converter (V·VAC) 67 for converting the digital video output from the video processor 66 into an analog video signal, and an audio digital/analog converter (A·DAC) 67 for converting the digital audio output from the A decoder 68 into an analog audio signal.

The analog video signal from the V·DAC 67 and the analog audio signal from the A·DAC 67 are supplied via the AV output section 46 to an external component (not shown) (a multichannel stereo system with two to six channels+ monitor TV or projector).

The data processing operation, that is, the video-recording and reproducing processes, in the above recording/reproducing system (DVD video recorder) will be explained.

In data processing during video-recording, when the MPU section 30 receives a video-recording instruction as a result of the user's key input, the necessary management data is read from the DVD disk 10 from the disk drive section 32 and an area to be written into is determined. Next, setting is done in the management area so that the recording data may be written in the determined area. The write start address for the video data is set in the drive section 32, thereby preparing to record the data.

The management area that is set indicates a file management section (directory code in ISO 9660) and control information 78. The necessary parameters are recorded in the file management section.

Next, the MPU 32 resets the time in the STC section 38. At this time, the STC section 38 effects video-recording and reproducing on the basis of the value in the timer of the system. Thereafter, the MPU section 30 implements setting in each of the other sections.

The flow of the video signal is as follows. The AV signal supplied from the TV tuner section 44 or by an external input is A/D converted by the ADC 52. The picture signal is inputted to the video encode section 53, the audio signal is inputted to the audio encode section 54, and the TV tuner section 44 inputs a closed caption signal or a text signal in teletext or the like, to the SP encode section 55.

Each decode section compresses each signal into packets (in such a manner that, when each packet is divided into packs, each pack contains 2048 bytes) and input them to the formatter 56. The respective decoder sections 53, 54, and 55 decide and record the PTS and DTS of each packet according to the value in the STC section 38, as the need arises.

The formatter section 56 stores the packet data into the buffer memory section 57 temporarily and thereafter packs each of the inputted packet data items, mixes them on a GOP basis, and inputs the resulting data to the D-PRO section 36.

The D-PRO section 36 puts together units of 16 packs into ECC groups and sends them labeled with ECC to the drive section 32. When the drive section 32 is not ready for recording, the D-PRO section 36 transfers them to the temporary storage section 34 and waits for the drive section 32 to be ready for recording. When being ready for recording, the drive section 32 starts to record. To hold more than several minutes of recording data in high-speed accessing, the temporary storage section 34 is expected to be a large capacity memory.

At the time of recording end, the information necessary after the recording end is recorded in the playback control information 102 in the control information 78 and the volume & file management area 70 and then the video-recording operation is ended. To read and write files from and into the volume & file management area 70, the microcomputer can read and write data from and into the D-PRO section 36 via a microcomputer bus.

In data processing during playback, when the MPU section 30 receives a playback instruction as a result of the user's key input, it reads the volume & file management area 70 via the D-PRO section 36 from the drive section 32 and decides the address to be reproduced. Here, the management area indicates a volume descriptor and a file management section. The volume descriptor is used to judge whether or not the disk is a DVD disk. The information in the file management section is used to take out the control information 78. On the basis of the control information 78, the video objects 82, 84, and 86 corresponding to the title to be reproduced are determined and the address at which playback is to be started is decided.

The MPU section 30 sends the address of the decided data to be reproduced and a read instruction to the drive section 32. The drive section 32 reads the sector data from the disk 10 according to the sent instruction, corrects errors in the data at the D-PRO section 36, and outputs the data in the form of packs to the decode section 60.

In the decode section 60, the separator 62 receives the read pack data, puts together the data into packets, and transfers them according to the type of data in such a manner that it transfers the video packet data (MPEG video data) to the video decode section 64, the audio packet data 68 to the audio decode section 68, and the sub-picture packet data to the SP decode section 65. The PTS of each of the sent packet data items is loaded into the STC section (the MPU section 30 sets the PTS in the pack in the STC 38, or the video decoder section 64 sets the PTS of the video data item in the STC section automatically). Thereafter, each decode section carries out the playback process in synchronization with the value of the PTS (presentation time stamp) in the packet data item (while comparing the value of the PTS with that of the STC), thereby reproducing moving pictures with titles on TV.

Furthermore, the playback operation of the microcomputer of the present invention will be explained according to the operation flow shown in FIGS. 16 and 17. A normal playback operation will start, when the PLAY key is pressed. At this time, if the title number has not been specified beforehand, the playback of a file with title 1 corresponding to the default, that is, a video object (VOBU), is assumed to be started.

Figure 16:
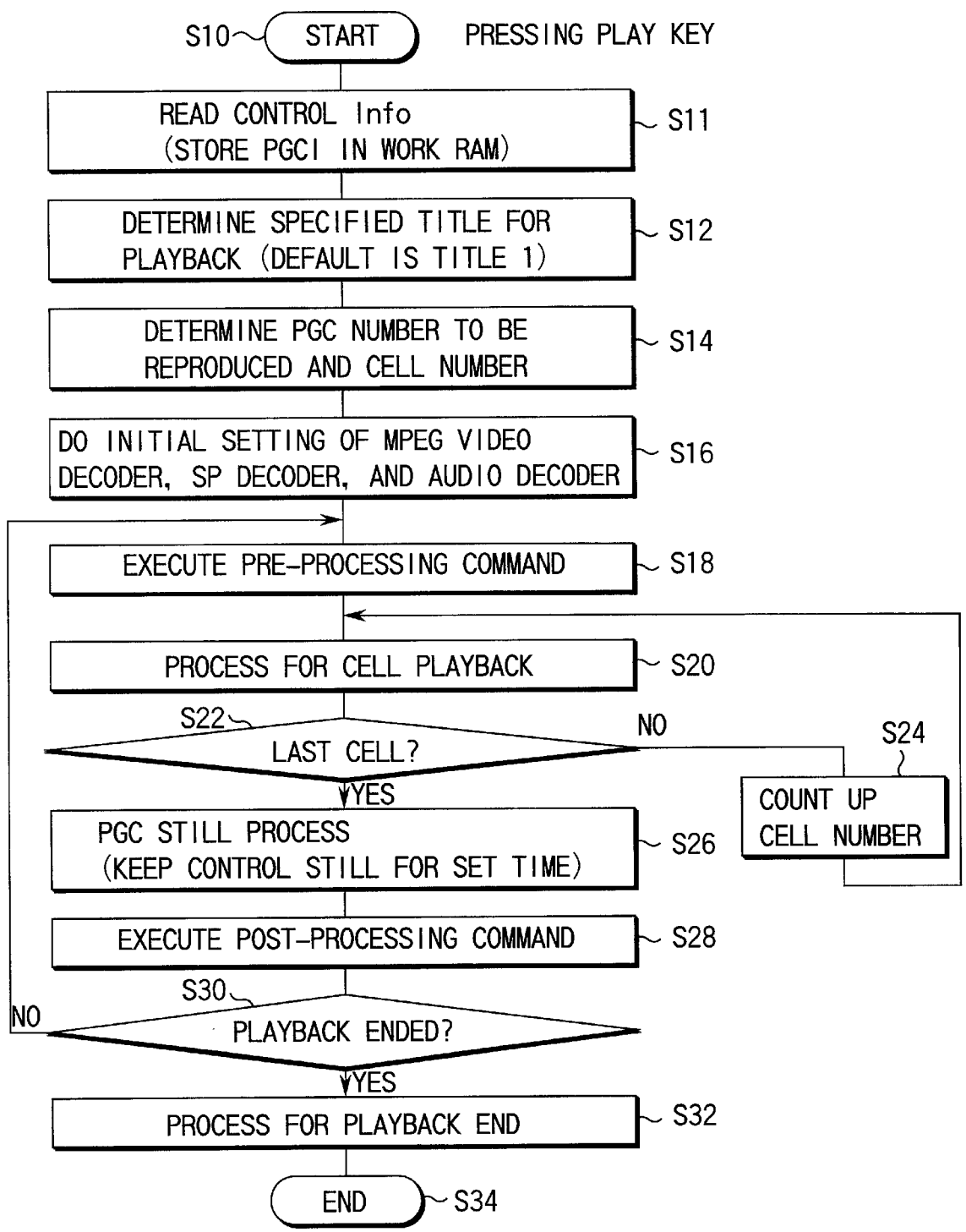
FIG. 16 is a flowchart showing a normal playback operation in the DVD video recorder shown in FIG. 15.
Figure 17:
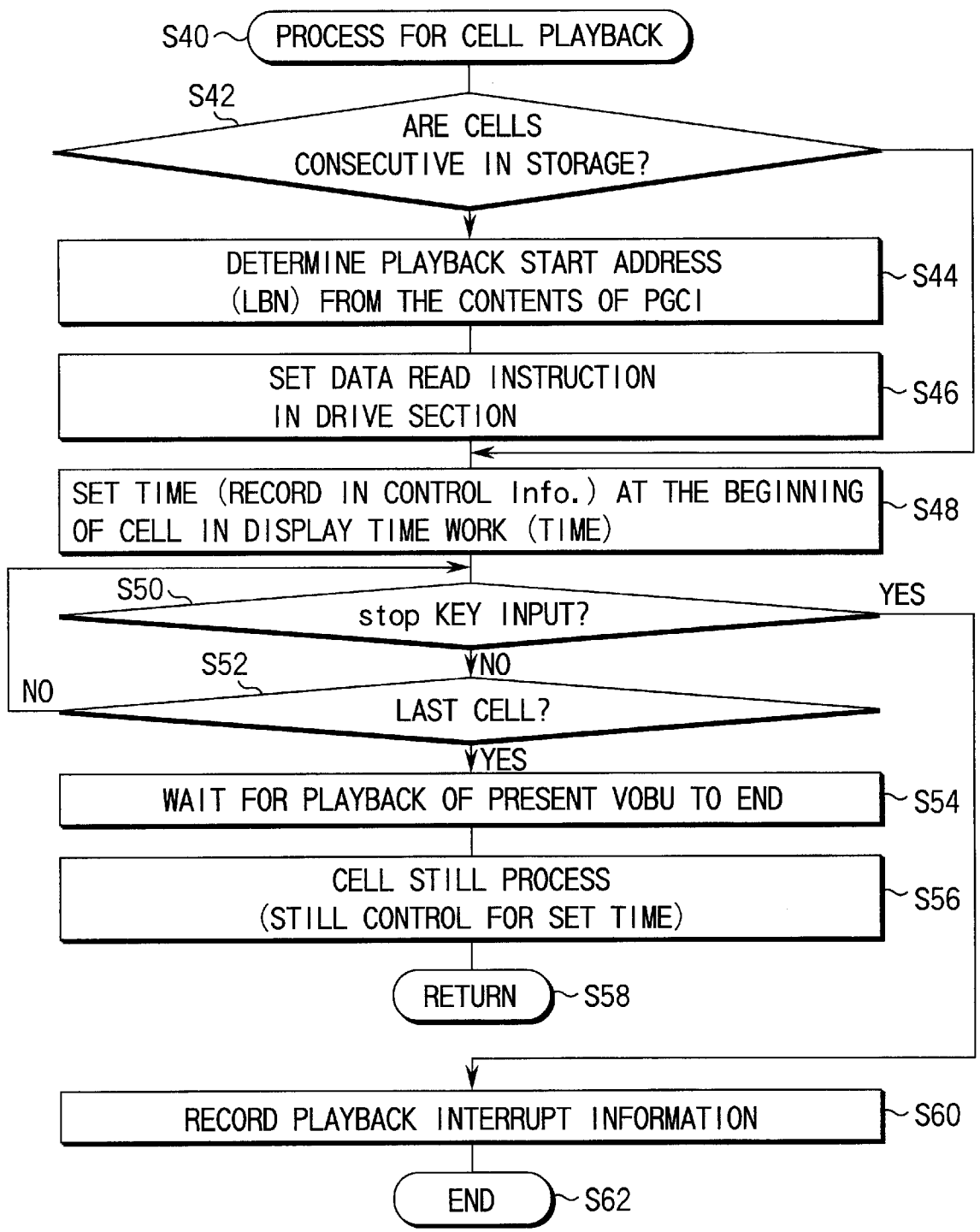
FIG. 17 is a flowchart showing the process of playing back cells during a normal playback operation in the DVD video recorder shown in FIG. 15.

When step S10 in FIG. 16 is started, the control information 78 is read first as shown in step 12. Specifically, the PGC information 116 of FIG. 8 in the control information 78 is read into the MPU 30. As shown in step 14, when the user specifies a title, or default title 2 is selected, each piece of information on the desired title is taken in from the search pointer in the PGC information table 110 and the beginning address of the video object is taken out. Namely, the PGC number to be reproduced and the cell number are determined. AS shown in step S16, each decoder is subjected to initial setting according to the contents written in the playback management table of the control information. As shown in step 18, the cell to be reproduced is searched for according to the contents of the PGC I 116 and the necessary pre-processing command is executed. The pre-processing command is written in a command table provided in the PGC information table 110, as the need arises. Thereafter, the cell is reproduced as shown in step S20. AS shown in step S22, when the cell reproduced is not the last cell, the next cell number is counted up as shown in step S24, and control is passed to step S20.

At step S22, the playback end of the cell is waited for. After the cell has played back, control is kept still for the still time of the cell as shown in step S26. When the still time is 0, control is passed without doing anything to the next step S28. Thereafter, a post-processing command is executed at step S28. Like the pre-processing command, the post-processing command is written in a command table provided in the PGC information table 110, as the need arises, and is taken out, as the occasion demands.

When at step S30, the playback does not end and there is a PGC to be reproduced next, the next PGC number is determined and control is passed to step S18. When the playback ends, a playback end process is executed at step S32. That is, each decoder is reset and the GPRM is reset.

Next, the cell playback operation of the microcomputer shown in steps S20 and S22 of FIG. 16 will be explained according to the operation flow of FIG. 17. When the process in reproducing a cell shown in step S40 is started, a check is made to see if VOBUs are consecutive as shown in step S42. If they are consecutive, control is passed to step S48. In step S42, when the cells are not consecutive, the PGC information 116 is referred to at step 44, the playback start address is determined, and the data read command, together with the playback start address, is set in the drive section 32. The control information 78, that is, the cell playback start time (C_PBTM) in the cell playback information 120 is taken in by the MPU 30 and stored in the RAM. The cell playback start time (C_PBTM) is displayed on the display unit and the playback of the cell is resumed on the basis of the playback time. As shown in step S50, when the stop key is pressed in the course of reproducing the cell, control is passed to step 60, where a playback interrupt operation is started. That is, the necessary playback interrupt information is written in a playback interrupt information table prepared as a single file shown in FIG. 9. Thereafter, the cell playback ends on the basis of the a playback stop instruction as shown in step S62.

When at step S50, the stop key is not pressed in the course of reproducing the cell, a check is made at step 52 to see if the cell corresponds to the last cell. If the cell is not the last cell, control is returned to step S50. If the cell is the last cell, the playback of the last VOBU in the cell is waited for as shown in step S54. When the playback of the last VOBU has ended, control is kept still for the still time of the cell and control is passed to the next step S58. When the still time is 0, control is passed without doing anything to the next step S58. Because the cell is the last cell at step 58, control is passed to step S26 in FIG. 16.

Figure 18:
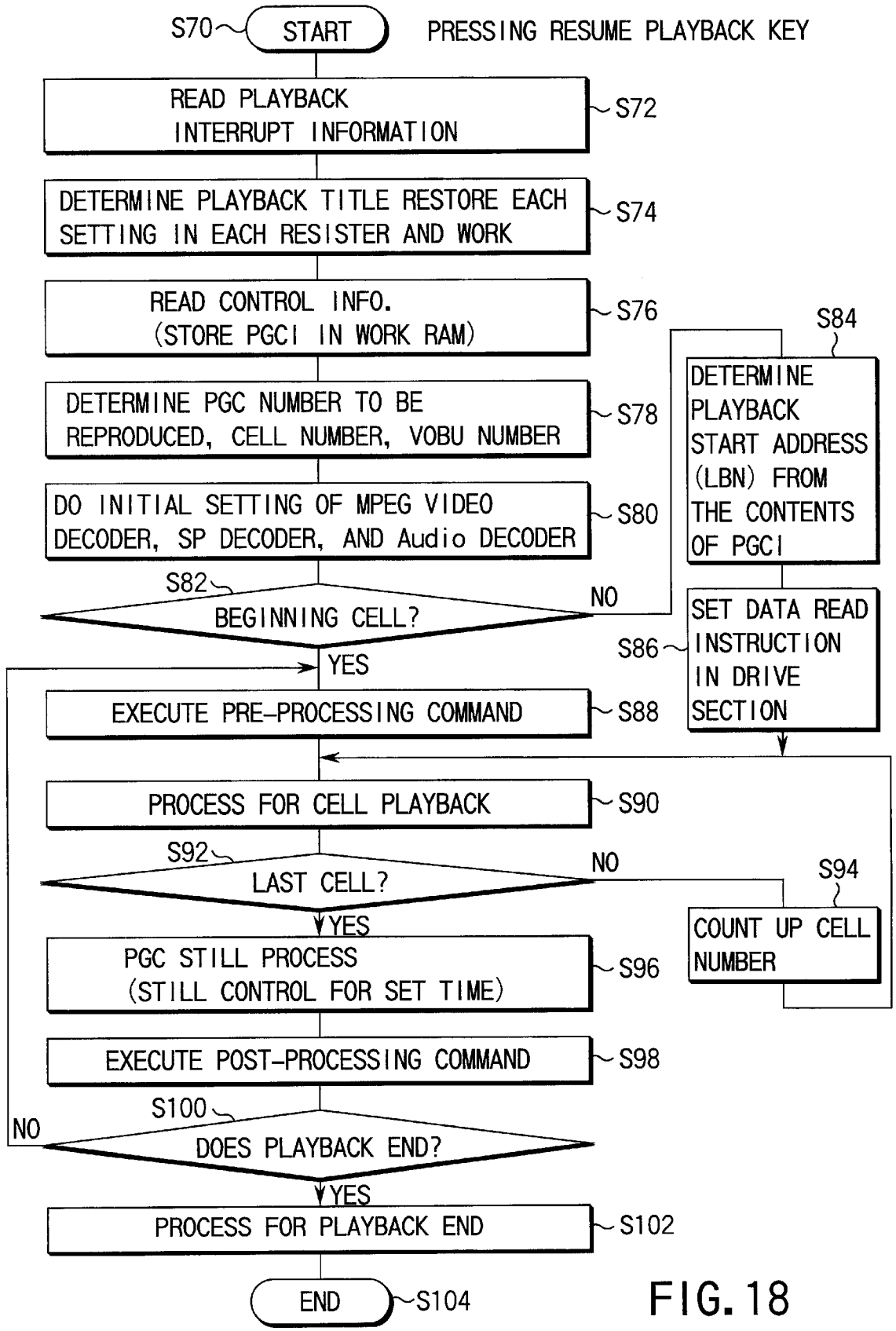
FIG. 18 is a flowchart showing a resume playback operation in the DVD video recorder shown in FIG. 15.

The process in a case where, for example, the DVD disk 10 is removed after the cell playback is interrupted, and then the DVD disk 10 is loaded into the DVD recorder again to resume the playback will be explained by reference to FIG. 18.

After the DVD disk 10 has been loaded into the DVD recorder, when the playback is resumed by pressing the resume playback key as shown in step S70, the playback interrupt information table of FIG. 9 is first read from the disk as shown in step S72. On the basis of the playback interrupt information in the playback interrupt information table, the playback title during interruption, in other words, the video object is determined. On the basis of the information, the register in each section is set. The necessary information in the information is stored again into the RAM of the MPU 30. Thereafter, the control information 102 is read at step S76. Here, the PGC information 116 is stored in the RAM of the MPU 30. As shown in step S78, the PGC number to be reproduced, cell number, and VOBU number are determined on the basis of the playback interrupt information in the playback interrupt information table. As shown in step S80, the video decoder 64, sub-picture decoder 65, and audio decoder 68 are set similarly on the basis of the playback interrupt information. As shown in step S82, a check is made to see if the address at which the playback is to be resumed is the beginning of the cell. If it is the beginning of the cell, the pre-processing command is executed as in the normal playback process at step 18. Thereafter, control is passed to step S90, where the normal playback process shown in FIG. 16 is executed. Specifically, the process in cell playback is executed as in step S20 of FIG. 16. If the address at which the playback is to be resumed is not the beginning of the cell, the PGC information 116 is read as shown in step S84 and the playback start address is determined. For example, the relative address of the VOBU is referred to and the relative address is added to the first VOBU address in the cell, thereby determining the playback start address. Once the playback start address has been determined, a read instruction is given to the drive section 32 using the address as shown in step S86. At step S90, the VOBU is interpreted as the first VOBU and the playback of the first VOBU is resumed as in the normal cell playback. Step S92 to step 104 after the resumption correspond to the processes from step S22 to step S34, which executes processes similar to what has been explained above. Thus, for detailed explanation, refer to step S22 to step S34 shown in FIG. 16.

Next, the process of displaying the playback remaining time using the playback interrupt information in the playback interrupt information table shown in FIG. 9 will be explained by reference to FIG. 19. The playback remaining time corresponds to the remaining time of the program in a case where a certain program is recorded on a disk or more than one program is recorded on a disk and the user interrupts the playback in the course of playing back the program, leaving part of the program unwatched, or to the playback time of the program in a case where there are some the user has not watched in the programs recorded on the disk. The programs recorded on the DVD disk are important to the user. In addition, whether the user has watched the programs, and if not, how long the remaining time is are also important to the user. In a case where the remaining time can be known disk by disk, if busy users of today can know easily whether they can watch the programs in free time, this will help provide the user a comfortable environment.

Figure 19:
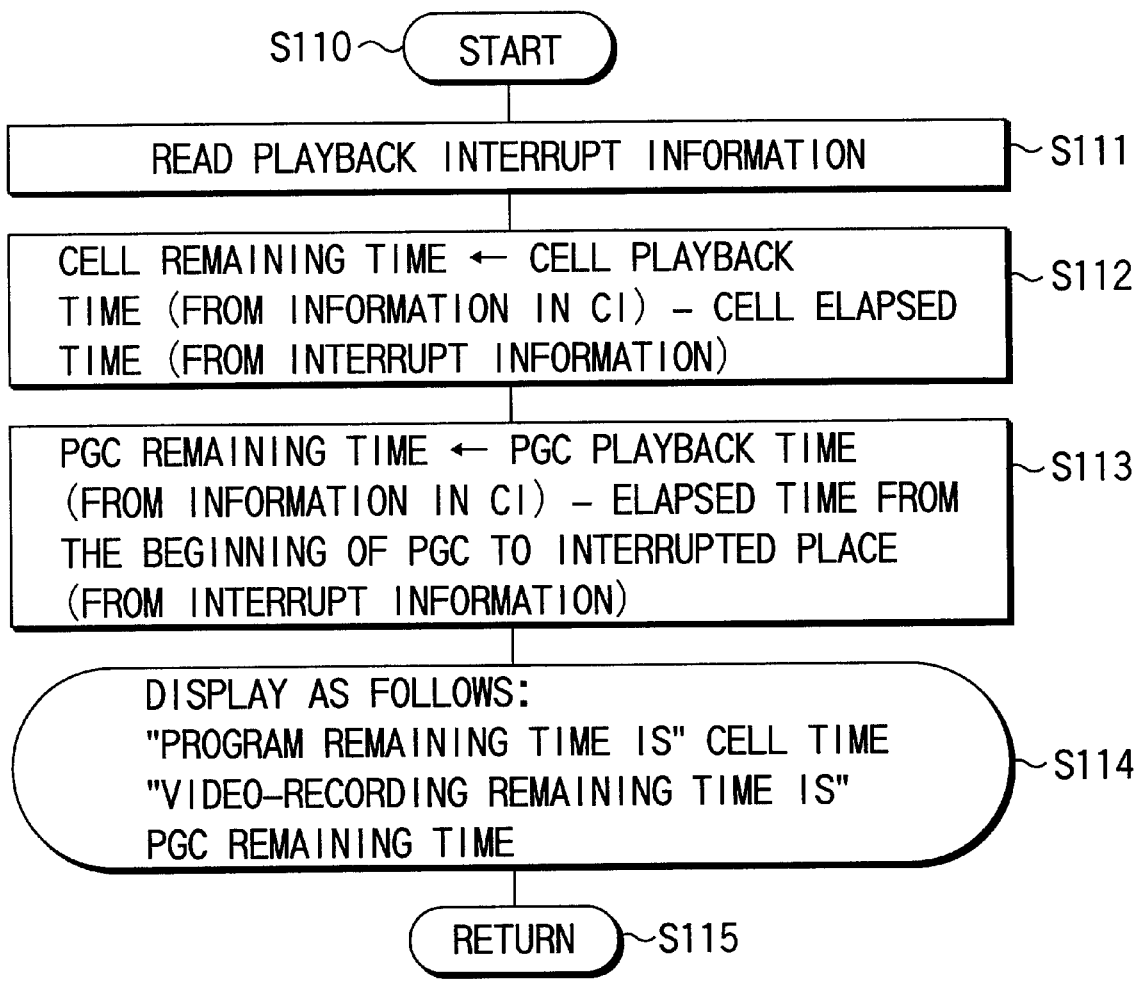
FIG. 19 is a flowchart showing the process of displaying the playback remaining time using the playback interrupt information shown in FIG. 9.

In the processing of FIG. 19, explanation will be given, provided that a cell corresponds to a program and a PGC corresponds to a recorded title. First, a DVD disk unknown as to whether it has been watched is loaded into the disk changer section 110, thereby making preparations for playback. Thereafter, as shown in step S110 of FIG. 19, when the remaining time key is pressed via the key input section (not shown), the process of displaying the playback remaining time is started. After the process is started as shown in step 111, the playback interrupt information shown in FIG. 9 is read and the cell ID whose playback has been interrupted is checked. Referring to the cell ID, the cell playback information of FIG. 13 corresponding to the cell is read. The playback time of the cell is taken out from the cell playback information and the elapsed time in the cell indicating the time during which playback has performed in the cell is take out from the playback interrupt information. The cell remaining time is calculating from both of those, or by subtracting the elapsed time in the cell from the cell playback time. Similarly, as shown in step S113, the PGC number of the interrupted PGC is checked from the playback interrupt information. The PGC general information of FIG. 12 corresponding to the PGC number is read and the PGC playback time is taken out. At the same time, the elapsed time, the total value of the playback time of the already reproduced cell constituting the PGC, is calculated using the cell playback information. The playback remaining time in the PGC is calculated from both of those, or by subtracting the elapsed time until the interruption of the playback from the PGC playback time. Thereafter, as shown in step S114, the program remaining time is displayed as the playback remaining time of the cell and the-video-recording remaining time is displayed as the PGC remaining time. After the display has been acknowledged by the user, the process of displaying the playback remaining time is ended as shown in step S115, and control is returned to the playback preparing state.

In the above embodiment, a format structure as shown in FIG. 3 proposed as a new recording and reproducing standard has been explained. In additional explanation, there is the following structure according to a DVD video ROM complying with the already determined recording and reproducing standard. This structure will be explained by reference to FIGS. 20 and 21.

Figures 20, 21:
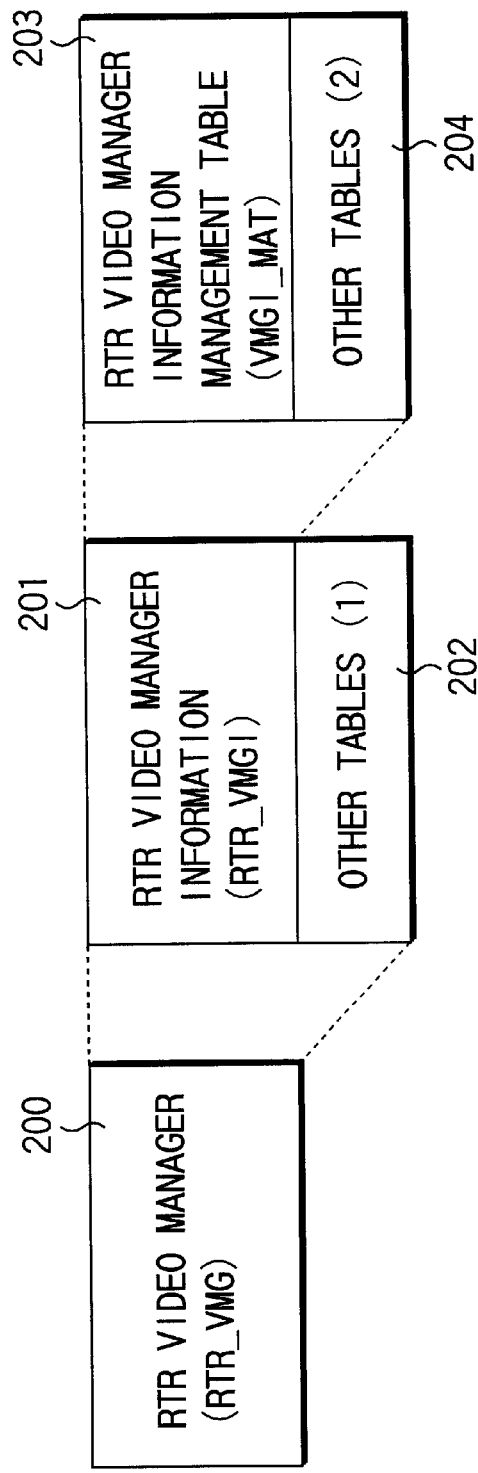
FIG. 20 is a hierarchical diagram showing a modification of the embodiment of the format shown in FIG. 3.
FIG. 21 is a table showing the contents of the description of the resume marker information written in the video management information management table shown in FIG. 20.

An RTR (Real Time Recorder) video manager 200 (RTR_VMG) shown in FIG. 20 corresponds to the control information shown in FIG. 3A. Following the RTR video manager, a video object set 80 is arranged. Its structure is the same, so its explanation will not be given.

The RTR video manager 200 (RTR_VMG) includes RTR video manager information 201. (RTR_VMGI) and other tables (1) 202. The RTR video manager information 201 (RTR_VMGI) includes a video manager information management table 203 (VMGI_MAT) for managing the RTR video manager information 201 (RTR_VMGI) and other tables (2). In the video manager information management table 203 (VMGI_MAT), a VMG identifier, management information including the end addresses of RTR_VMG and VMGI, and resume marker information (RSM_MARKI) acting as the playback interrupt information are written. As shown in FIG. 21, in the resume marker information (RSM_MARKI), the PGC number (PGCN) at which the marker point indicating the interrupt point is present, program number (PGN), and cell number (CN) are written as interrupt information, as in the table of FIG. 9. Furthermore, the relative time in the marker point cell, in other words, the elapsed time until interruption in the VBOU to which the cell belongs is written as PTM (Presentation Time Stamp) using a marker point (MRK_PT). Because most cells are generally recorded in such a manner that they coincide with VOBs, the time expressed by the marker point (MRK_PT) is such that the elapsed time until interruption in the cell is expressed in PTM (Presentation Time Stamp) form. The time when a marker point (MRK_PT) is attached is written as a marked time (MRK_TM).

In the other tables (1) and (2) 202 and 204 in FIG. 20, various types of information, including the playback control information 102, recording control information 104, editing control information 106, and reduced drawing information 108, are written at the same level or different levels of hierarchy.

In the resume marker information (RSM_MARKI) shown in FIG. 21, the address of the VOBU to be reproduced first after the interruption of playback is not written. It is, however, marked easily by preparing a time map describing the relationship between the elapsed time in the cell marked with the marker specified by a cell number and the address of the VOBU in the other tables (1). That is, the VOBU to be reproduced after interruption can be determined. Namely, in the other tables (1), an information table about moving-picture files is provided. In the table, files about moving-picture VOB information is provided. The files about moving-picture VOB information include time map information in which information on the VOBUs in the files is written in time map form. In the time map information, the playback start time and size of each VOBU are written. Therefore, referring to the marker point (MRK_PT) in the resume marker information (RSM_MARKI), the VOBU is determined from the time during the interruption of the playback. The address of the determined VOBU can be calculated by calculating the sum of the sizes of the VOBUs in the VOB reproduced before the determined VOBU. The VOBU determined by the calculated address is the VOBU to be reproduced first after the interruption of the playback.

Because in the format of FIG. 20, the resume marker information (RSM_MARKI) is written as VMGI_MAT 204 at a relatively higher level of hierarchy, the player can use the information immediately. Such a structure is, therefore, a user-friendly structure.

Industrial Applicability

As explained above, with the present invention, because the playback interrupt information has been written on a disk serving as a video-recording and reproducing information recording medium, even if the disk is removed from the system, the playback can be resumed after the disk is installed again.

What is claimed is:

1. An information recording medium comprising:
   a first area configured to store audio/video data, said audio/video data containing at least one video object in which image data is stored in a predetermined unit;
   a second area configured to store management data for managing said audio/video data;
   a playback control information area included in said second area;
   a playback interrupt information table included in said playback control information area and configured to store playback interrupt information when an interruption of a playback of said at least one video object occurs, wherein said playback interrupt information includes,
      information of a marker point in the at least one video object, the marker point expressed in presentation time stamp form, and
      a presentation starting time for reproducing the at least one video object.

2. An information recording method for recording information on an information recording medium which includes,
   a first area configured to store audio/video data, said audio/video data containing at least one video object in which image data is stored in a predetermined unit,
   a second area configured to store management data for managing said audio/video data,
   a playback control information area included in said second area,
   a playback interrupt information table included in said playback control information area and configured to store playback interrupt information when an interruption of a playback of said at least one video object occurs, wherein said playback interrupt information includes,
      information of a marker point in the at least one video object, the marker point expressed in presentation time stamp form, and
      a presentation starting time for reproducing the at least one video object,
   the information recording method comprising:
      recording said audio/video data in said first area; and
      recording said management data in said second area, including storing playback interrupt information in said playback interrupt information table when said interruption of said playback of said at least one video object occurs.

3. An information reproducing method for reproducing information on an information recording medium which includes,
   a first area including audio/video data, said audio/video data containing at least one video object in which image data is stored in a predetermined unit,
   a second area including management data for managing said audio/video data,
   a playback control information area included in said second area,
   a playback interrupt information table included in said playback control information area and configured to store playback interrupt information when an interruption of a playback of said at least one video object occurs, wherein said playback interrupt information includes,
      information of a marker point in the at least one video object, the marker point expressed in presentation time stamp form, and
      a presentation starting time for reproducing the at least one video object,
   the information reproducing method comprising:
      reproducing said at least one video object; and
      reproducing said playback interrupt information.

4. An information reproducing apparatus for reproducing information on an information recording medium which includes,
   a first area including audio/video data, said audio/video data containing at least one video object in which image data is stored in a predetermined unit,
   a second area including management data for managing said audio/video data,
   a playback control information area included in said second area,
   a playback interrupt information table included in said playback control information area and configured to store playback interrupt information when an interruption of a playback of said at least one video object occurs, wherein said playback interrupt information includes,
      information of a marker point in the at least one video object, the marker point expressed in presentation time stamp form, and
      a presentation starting time for reproducing the at least one video object,
   the information reproducing apparatus comprising:
      a first reproducer configured to reproduce said at least one video object; and
      a second reproducer configured to reproduce said playback interrupt information.

* * * * *